US011908369B2

(12) United States Patent
Yim et al.

(10) Patent No.: US 11,908,369 B2
(45) Date of Patent: Feb. 20, 2024

(54) CONTRAST ENHANCEMENT DEVICE, AND DISPLAY DEVICE INCLUDING THE SAME

(71) Applicant: Samsung Display Co., LTD., Yongin-si (KR)

(72) Inventors: Dale Yim, Suwon-si (KR); Seok Hwan Roh, Daejeon (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/088,867

(22) Filed: Dec. 27, 2022

(65) Prior Publication Data

US 2023/0410710 A1 Dec. 21, 2023

(30) Foreign Application Priority Data

Jun. 21, 2022 (KR) ........................ 10-2022-0075433

(51) Int. Cl.
*G09G 3/20* (2006.01)
*G09G 3/00* (2006.01)

(52) U.S. Cl.
CPC ........... *G09G 3/2007* (2013.01); *G09G 3/035* (2020.08); *G09G 3/2011* (2013.01); *G09G 2310/0202* (2013.01); *G09G 2320/066* (2013.01); *G09G 2320/0686* (2013.01); *G09G 2330/12* (2013.01); *G09G 2340/06* (2013.01); *G09G 2352/00* (2013.01); *G09G 2360/16* (2013.01); *G09G 2380/10* (2013.01)

(58) Field of Classification Search
CPC ...... G09G 3/2007; G09G 3/2011; G09G 3/35; G09G 2310/0202; G09G 2320/066; G09G 2320/0686; G09G 2330/12; G09G 2340/06; G09G 2352/00; G09G 2360/16; G09G 2380/10
USPC ........................................................ 345/694
See application file for complete search history.

(56) References Cited

U.S. PATENT DOCUMENTS 7,688,338 B2 * 3/2010 Kao ..................... G09G 3/2007 345/89
8,314,759 B2 * 11/2012 Lu ........................ G09G 3/3406 345/87
9,635,377 B2 * 4/2017 Kim ..................... H04N 19/463
9,864,243 B2 * 1/2018 Erinjippurath ....... H04N 13/351
10,490,167 B2 * 11/2019 Cianfrone .............. G09G 5/363
10,984,698 B2 * 4/2021 Shin ..................... G09G 3/2007
(Continued)

*Primary Examiner* — Tom V Sheng
(74) *Attorney, Agent, or Firm* — CANTOR COLBURN LLP

(57) ABSTRACT

A contrast enhancement device included in a display device includes an analysis circuit which receives input image data as input data in a normal mode, receives input test data as the input data in a diagnosis mode, and determines a contrast enhancement coefficient by analyzing the input data, a process circuit which generates output data by performing a contrast enhancement process on the input data based on the contrast enhancement coefficient, where the output data in the normal mode is output image data corresponding to the input image data, and the output data in the diagnosis mode is output test data corresponding to the input test data, and a diagnosis circuit which outputs the output image data in the normal mode, and generates diagnosis result data for the contrast enhancement device by comparing the output test data with reference test data in the diagnosis mode.

20 Claims, 21 Drawing Sheets

(56) References Cited

U.S. PATENT DOCUMENTS

| | | | | |
|---|---|---|---|---|
| 2008/0037866 | A1* | 2/2008 | Na | H04N 5/57 348/E5.119 |
| 2011/0317074 | A1* | 12/2011 | Kim | G09G 5/04 348/739 |
| 2014/0049734 | A1* | 2/2014 | Erinjippurath | G02F 1/133536 349/96 |
| 2015/0268499 | A1* | 9/2015 | Sorek | G02F 1/13306 359/239 |
| 2016/0163248 | A1* | 6/2016 | Yang | G09G 5/003 345/690 |
| 2017/0193964 | A1* | 7/2017 | Wen | G09G 3/3233 |
| 2020/0082511 | A1* | 3/2020 | Leem | G06T 5/003 |

* cited by examiner

FIG. 3B

IN_LOW = Y_AVG/2 352

IN_MID = Y_AVG 354

IN_HIGH = (Y_MAX-Y_AVG)/2 + Y_AVG 356

OUT_LOW = IN_LOW - |(Y_LOW - IN_LOW)| 362

OUT_MID = IN_MID 364

OUT_HIGH = IN_HIGH + |(Y_HIGH - IN_HIGH)| 366

FIG. 4A

DIFF_LOW = IN_LOW - OUT_LOW 372

OUT_LOW' = IN_LOW - (DIFF_LOW * GAIN) 374

DIFF_HIGH = OUT_HIGH - IN_HIGH 382

OUT_HIGH' = IN_HIGH + (DIFF_HIGH * GAIN) 384

FIG. 5

```
IF (Y_IN < IN_MID)

CONV_DIFF = 2*(OUT_LOW-IN_LOW)*Y_IN/IN_LOW - (OUT_LOW-IN_LOW)*(Y_IN)^2/(IN_LOW)^2   410

IF (Y_IN > IN_MID)

CONV_DIFF = 2*(OUT_HIGH-IN_HIGH)*(Y_IN-IN_MID)/(IN_HIGH-IN_MID) -   430
(OUT_HIGH-IN_HIGH)*(Y_IN-IN_MID)^2/(IN_HIGH-IN_MID)^2

IF (Y_IN = IN_MID)   450
CONV_DIFF = 0

Y_OUT = Y_IN + CONV_DIFF   470
```

| COMPARISON RESULT | | DRDAT_R1 | |
|---|---|---|---|
| | | B1 | B2 |
| OTDAT_R1_CH1 = RTDAT_R1_CH1 | OTDAT_R1_CH2 = RTDAT_R1_CH2 | 1 | 1 |
| | OTDAT_R1_CH2 ≠ RTDAT_R1_CH2 | 1 | 0 |
| OTDAT_R1_CH1 ≠ RTDAT_R1_CH1 | OTDAT_R1_CH2 = RTDAT_R1_CH2 | 0 | 1 |
| | OTDAT_R1_CH2 ≠ RTDAT_R1_CH2 | 0 | 0 |

FIG. 10B

| COMPARISON RESULT | | DRDAT_R2 | |
|---|---|---|---|
| | | B1 | B2 |
| OTDAT_R2_CH1 = RTDAT_R2_CH1 | OTDAT_R2_CH2 = RTDAT_R2_CH2 | 1 | 1 |
| | OTDAT_R2_CH2 ≠ RTDAT_R2_CH2 | 1 | 0 |
| OTDAT_R2_CH1 ≠ RTDAT_R2_CH1 | OTDAT_R2_CH2 = RTDAT_R2_CH2 | 0 | 1 |
| | OTDAT_R2_CH2 ≠ RTDAT_R2_CH2 | 0 | 0 |

FIG. 10C

| DRDAT_R1 | DRDAT_R2 | FAULT POSITION |
|---|---|---|
| 01 | 01 | 162a |
| 10 | 10 | 164a |
| 00 | 11 | 142a |
| 11 | 00 | 144a |

FIG. 14A

| COMPARISON RESULT | | | | DRDAT_R1 | | | |
|---|---|---|---|---|---|---|---|
| | | | | B1 | B2 | B3 | B4 |
| OTDAT_R1_CH1 = RTDAT_R1_CH1 | OTDAT_R1_CH2 = RTDAT_R1_CH2 | OTDAT_R1_CH3 = RTDAT_R1_CH3 | OTDAT_R1_CH4 = RTDAT_R1_CH4 | 1 | 1 | 1 | 1 |
| | | | OTDAT_R1_CH4 ≠ RTDAT_R1_CH4 | 1 | 1 | 1 | 0 |
| | | OTDAT_R1_CH3 ≠ RTDAT_R1_CH3 | OTDAT_R1_CH4 = RTDAT_R1_CH4 | 1 | 1 | 0 | 1 |
| | | | OTDAT_R1_CH4 ≠ RTDAT_R1_CH4 | 1 | 1 | 0 | 0 |
| | OTDAT_R1_CH2 ≠ RTDAT_R1_CH2 | OTDAT_R1_CH3 = RTDAT_R1_CH3 | OTDAT_R1_CH4 = RTDAT_R1_CH4 | 1 | 0 | 1 | 1 |
| | | | OTDAT_R1_CH4 ≠ RTDAT_R1_CH4 | 1 | 0 | 1 | 0 |
| | | OTDAT_R1_CH3 ≠ RTDAT_R1_CH3 | OTDAT_R1_CH4 = RTDAT_R1_CH4 | 1 | 0 | 0 | 1 |
| | | | OTDAT_R1_CH4 ≠ RTDAT_R1_CH4 | 1 | 0 | 0 | 0 |
| OTDAT_R1_CH1 ≠ RTDAT_R1_CH1 | OTDAT_R1_CH2 = RTDAT_R1_CH2 | OTDAT_R1_CH3 = RTDAT_R1_CH3 | OTDAT_R1_CH4 = RTDAT_R1_CH4 | 0 | 1 | 1 | 1 |
| | | | OTDAT_R1_CH4 ≠ RTDAT_R1_CH4 | 0 | 1 | 1 | 0 |
| | | OTDAT_R1_CH3 ≠ RTDAT_R1_CH3 | OTDAT_R1_CH4 = RTDAT_R1_CH4 | 0 | 1 | 0 | 1 |
| | | | OTDAT_R1_CH4 ≠ RTDAT_R1_CH4 | 0 | 1 | 0 | 0 |
| | OTDAT_R1_CH2 ≠ RTDAT_R1_CH2 | OTDAT_R1_CH3 = RTDAT_R1_CH3 | OTDAT_R1_CH4 = RTDAT_R1_CH4 | 0 | 0 | 1 | 1 |
| | | | OTDAT_R1_CH4 ≠ RTDAT_R1_CH4 | 0 | 0 | 1 | 0 |
| | | OTDAT_R1_CH3 ≠ RTDAT_R1_CH3 | OTDAT_R1_CH4 = RTDAT_R1_CH4 | 0 | 0 | 0 | 1 |
| | | | OTDAT_R1_CH4 ≠ RTDAT_R1_CH4 | 0 | 0 | 0 | 0 |

FIG. 14B

| COMPARISON RESULT | | | | DRDAT_R1 | | | |
|---|---|---|---|---|---|---|---|
| | | | | B1 | B2 | B3 | B4 |
| OTDAT_R2_CH1 = RTDAT_R2_CH1 | OTDAT_R2_CH2 = RTDAT_R2_CH2 | OTDAT_R2_CH3 = RTDAT_R2_CH3 | OTDAT_R2_CH4 = RTDAT_R2_CH4 | 1 | 1 | 1 | 1 |
| | | | OTDAT_R2_CH4 ≠ RTDAT_R2_CH4 | 1 | 1 | 1 | 0 |
| | | OTDAT_R2_CH3 ≠ RTDAT_R2_CH3 | OTDAT_R2_CH4 = RTDAT_R2_CH4 | 1 | 1 | 0 | 1 |
| | | | OTDAT_R2_CH4 ≠ RTDAT_R2_CH4 | 1 | 1 | 0 | 0 |
| | OTDAT_R2_CH2 ≠ RTDAT_R2_CH2 | OTDAT_R2_CH3 = RTDAT_R2_CH3 | OTDAT_R2_CH4 = RTDAT_R2_CH4 | 1 | 0 | 1 | 1 |
| | | | OTDAT_R2_CH4 ≠ RTDAT_R2_CH4 | 1 | 0 | 1 | 0 |
| | | OTDAT_R2_CH3 ≠ RTDAT_R2_CH3 | OTDAT_R2_CH4 = RTDAT_R2_CH4 | 1 | 0 | 0 | 1 |
| | | | OTDAT_R2_CH4 ≠ RTDAT_R2_CH4 | 1 | 0 | 0 | 0 |
| OTDAT_R2_CH1 ≠ RTDAT_R2_CH1 | OTDAT_R2_CH2 = RTDAT_R2_CH2 | OTDAT_R2_CH3 = RTDAT_R2_CH3 | OTDAT_R2_CH4 = RTDAT_R2_CH4 | 0 | 1 | 1 | 1 |
| | | | OTDAT_R2_CH4 ≠ RTDAT_R2_CH4 | 0 | 1 | 1 | 0 |
| | | OTDAT_R2_CH3 ≠ RTDAT_R2_CH3 | OTDAT_R2_CH4 = RTDAT_R2_CH4 | 0 | 1 | 0 | 1 |
| | | | OTDAT_R2_CH4 ≠ RTDAT_R2_CH4 | 0 | 1 | 0 | 0 |
| | OTDAT_R2_CH2 ≠ RTDAT_R2_CH2 | OTDAT_R2_CH3 = RTDAT_R2_CH3 | OTDAT_R2_CH4 = RTDAT_R2_CH4 | 0 | 0 | 1 | 1 |
| | | | OTDAT_R2_CH4 ≠ RTDAT_R2_CH4 | 0 | 0 | 1 | 0 |
| | | OTDAT_R2_CH3 ≠ RTDAT_R2_CH3 | OTDAT_R2_CH4 = RTDAT_R2_CH4 | 0 | 0 | 0 | 1 |
| | | | OTDAT_R2_CH4 ≠ RTDAT_R2_CH4 | 0 | 0 | 0 | 0 |

FIG. 14C

| DRDAT_R1 | DRDAT_R2 | FAULT POSITION |
|---|---|---|
| 0111 | 0111 | 162b |
| 1011 | 1011 | 164b |
| 1101 | 1101 | 166b |
| 1110 | 1110 | 168b |
| 0000 | 1111 | 142b |
| 1111 | 0000 | 144b |

CONTRAST ENHANCEMENT DEVICE, AND DISPLAY DEVICE INCLUDING THE SAME

This application claims priority to Korean Patent Applications No. 10-2022-0075433, filed on Jun. 21, 2022, and all the benefits accruing therefrom under 35 U.S.C. § 119, the content of which in its entirety is herein incorporated by reference.

BACKGROUND

1. Field

Embodiments relate generally to a display device. More particularly, embodiments relate to a contrast enhancement device, and a display device including the contrast enhancement device.

2. Description of the Related Art

To improve an image quality, a display device including a contrast enhancement device is being developed. The contrast enhancement device may decrease a luminance of a low gray image or a low luminance image and may increase a luminance of a high gray image or a high luminance image, thereby enhancing an image contrast and improving an image quality.

The contrast enhancement device may be effectively used in a vehicle display device (or a display device in a vehicle) that operates in an environment where an external light having a high luminance exists. However, in a case where the contrast enhancement device of the vehicle display device does not normally operate, or in a case where a fault occurs in the contrast enhancement device of the vehicle display device, a visibility of an image displayed by the vehicle display device may be degraded, and thus a safety of the vehicle equipped with the vehicle display device may be degraded.

SUMMARY

Some embodiments provide a contrast enhancement device having a fault diagnosis function.

Some embodiments provide a display device including a contrast enhancement device having a fault diagnosis function.

According to some embodiments, there is provided a contrast enhancement device included in a display device. In such embodiments, the contrast enhancement device includes an analysis circuit which receives input image data as input data in a normal mode, receives input test data as the input data in a diagnosis mode, and determines a contrast enhancement coefficient by analyzing the input data, a process circuit which generates output data by performing a contrast enhancement process on the input data based on the contrast enhancement coefficient, where the output data in the normal mode is output image data corresponding to the input image data, and the output data in the diagnosis mode is output test data corresponding to the input test data, and a diagnosis circuit which outputs the output image data in the normal mode, and generates diagnosis result data for the contrast enhancement device by comparing the output test data with reference test data in the diagnosis mode.

In embodiments, the analysis circuit may determine an average luminance value, a low gray luminance value, a middle gray luminance value and a high gray luminance value of the input data by analyzing luminance values of the input data, and the analysis circuit may determine, as the contrast enhancement coefficient, a low gray input luminance value, a middle gray input luminance value, a high gray input luminance value, a low gray output luminance value, a middle gray output luminance value and a high gray output luminance value based on the average luminance value, the low gray luminance value, the middle gray luminance value and the high gray luminance value of the input data.

In embodiments, the analysis circuit may calculate an average luminance value of the luminance values of the input data. In such embodiments, when the average luminance value is lower than a first reference average luminance value, the analysis circuit may determine the low gray luminance value by calculating an average value of the luminance values lower than a first reference middle luminance value, the middle gray luminance value as the first reference middle luminance value, and the high gray luminance value by calculating an average value of the luminance values higher than the first reference middle luminance value. In such embodiments, when the average luminance value is higher than or equal to the first reference average luminance value and is lower than a second reference average luminance value, the analysis circuit may determine the low gray luminance value by calculating an average value of the luminance values lower than a second reference middle luminance value, the middle gray luminance value as the second reference middle luminance value, and the high gray luminance value by calculating an average value of the luminance values higher than the second reference middle luminance value. In such embodiments, when the average luminance value is higher than or equal to the second reference average luminance value, the analysis circuit may determine the low gray luminance value by calculating an average value of the luminance values lower than a third reference middle luminance value, the middle gray luminance value as the third reference middle luminance value, and the high gray luminance value by calculating an average value of the luminance values higher than the third reference middle luminance value.

In embodiments, the analysis circuit may determine the low gray input luminance value using equation: $IN\_LOW=Y\_AVG/2$, the middle gray input luminance value using equation: $IN\_MID=Y\_AVG$, the high gray input luminance value using equation: $IN\_HIGH=(Y\_MAX-Y\_AVG)/2+Y\_AVG$, the low gray output luminance value using equation: $OUT\_LOW=IN\_LOW-|(Y\_LOW-IN\_LOW)|$, the middle gray output luminance value using equation: $OUT\_MID=IN\_MID$, and the high gray output luminance value using equation: $OUT\_HIGH=IN\_HIGH+|(Y\_HIGH-IN\_HIGH)|$, where IN_LOW may represent the low gray input luminance value, IN_MID may represent the middle gray input luminance value, IN_HIGH may represent the high gray input luminance value, Y_AVG may represent the average luminance value, Y_LOW may represent the low gray luminance value, Y_HIGH may represent the high gray luminance value, Y_MAX may represent a maximum luminance value, OUT_LOW may represent the low gray output luminance value, OUT_MID may represent the middle gray output luminance value, and OUT_HIGH may represent the high gray output luminance value.

In embodiments, the analysis circuit may apply a gain coefficient to a difference between the low gray input luminance value and the low gray output luminance value to determine the low gray output luminance value having an increased difference with respect to the low gray input luminance value, and the analysis circuit may apply the gain coefficient to a difference between the high gray input luminance value and the high gray output luminance value to determine the high gray output luminance value having an increased difference with respect to the high gray input luminance value.

In embodiments, the process circuit may receive, as the contrast enhancement coefficient, a low gray input luminance value, a middle gray input luminance value, a high gray input luminance value, a low gray output luminance value, a middle gray output luminance value and a high gray output luminance value from the analysis circuit, the process circuit may determine a conversion difference value with respect to each luminance value of the input data by using the low gray input luminance value, the middle gray input luminance value, the high gray input luminance value, the low gray output luminance value, the middle gray output luminance value and the high gray output luminance value, and the process circuit may calculate an output luminance value corresponding to the luminance value of the input data by adding the conversion difference value to the luminance value of the input data.

In embodiments, when the luminance value of the input data is lower than the middle gray input luminance value, the process circuit may determine the conversion difference value for the luminance value using equation: CONV_DIFF=2*(OUT_LOW−IN_LOW)*Y_IN/IN_LOW−(OUT_LOW-IN_LOW)*(Y_IN)^2/(IN_LOW)^2, where CONV_DIFF may represent the conversion difference value, OUT_LOW may represent the low gray output luminance value, IN_LOW may represent the low gray input luminance value, and Y_IN may represent the luminance value of the input data. In such embodiments, when the luminance value of the input data is higher than the middle gray input luminance value, the process circuit may determine the conversion difference value for the luminance value using equation: CONV_DIFF=2*(OUT_HIGH−IN_HIGH)*(Y_IN−IN_MID)/(IN_HIGH−IN_MID)−(OUT_HIGH−IN_HIGH)*(Y_IN−IN_MID) ^2/(IN_HIGH−IN_MID)^2, where CONV_DIFF may represent the conversion difference value, OUT_HIGH may represent the high gray output luminance value, IN_HIGH may represent the high gray input luminance value, Y_IN may represent the luminance value of the input data, and IN_MID may represent the middle gray input luminance value. In such embodiments, when the luminance value of the input data is equal to the middle gray input luminance value, the process circuit may determine the conversion difference value as 0. The process circuit may calculate the output luminance value corresponding to the luminance value of the input data using equation: Y_OUT=Y_IN+CONV_DIFF, where Y_OUT may represent the output luminance value, Y_IN may represent the luminance value of the input data, and CONV_DIFF may represent the conversion difference value.

In embodiments, the contrast enhancement device may further include an RGB-to-YCbCr converter which performs an RGB-to-YCbCr conversion operation on the input image data to generate YCbCr data including luminance data and chrominance data, and provides the YCbCr data as the input image data to the analysis circuit, and an YCbCr-to-RGB converter which performs an YCbCr-to-RGB conversion operation on the output image data to generate RGB data.

In embodiments, the contrast enhancement device may further include an input select circuit which selectively provides, as the input data, the input image data or the input test data to the analysis circuit in response to a diagnosis enable signal.

In embodiments, the contrast enhancement device may further include a reference storage circuit which stores the reference test data which are previously determined with respect to the input test data.

In embodiments, the display device may include a display panel including a plurality of display regions, the input data may include a plurality of region data for the plurality of display regions, and the analysis circuit may include a plurality of region analysis circuits which generates region contrast enhancement coefficients for the plurality of display regions by analyzing the plurality of region data, respectively.

In embodiments, the input data may be transferred in parallel through a plurality of channels, and the process circuit may include a plurality of channel process circuits which performs the contrast enhancement process with respect to the plurality of channels, respectively.

In embodiments, the display device may include a foldable display panel including a first display region and a second display region divided by a folding line, and each of the first display region and the second display region may be selectively activated. In such embodiments, the input data may include first region data for the first display region and second region data for the second display region. In such embodiments, the analysis circuit may include a first region analysis circuit which generates a first region contrast enhancement coefficient for the first display region by analyzing the first region data, and a second region analysis circuit which generates a second region contrast enhancement coefficient for the second display region by analyzing the second region data.

In embodiments, each of the first region data and the second region data may be transferred in parallel through a first channel and a second channel. In such embodiments, the process circuit may include a first channel process circuit which performs the contrast enhancement process on the first region data transferred through the first channel based on the first region contrast enhancement coefficient in a first period in which the first region data are transferred, and performs the contrast enhancement process on the second region data transferred through the first channel based on the second region contrast enhancement coefficient in a second period in which the second region data are transferred, and a second channel process circuit which performs the contrast enhancement process on the first region data transferred through the second channel based on the first region contrast enhancement coefficient in the first period, and performs the contrast enhancement process on the second region data transferred through the second channel based on the second region contrast enhancement coefficient in the second period.

In embodiments, the input test data may include first and second input channel test data for the first and second channels with respect to the first display region, and third and fourth input channel test data for the first and second channels with respect to the second display region. In such embodiments, the reference test data may include first through fourth reference channel test data respectively corresponding to the first through fourth input channel test data. In the diagnosis mode, the first and second channel process circuits may respectively generate first and second output channel test data as the output test data by performing the contrast enhancement process on the first and second input channel test data in the first period, and may respectively generate third and fourth output channel test data as the output test data by performing the contrast enhancement process on the third and fourth input channel test data in the second period. In such embodiments, the diagnosis circuit may generate, as the diagnosis result data, first region diagnosis result data by respectively comparing the first and second output channel test data with the first and second reference channel test data, and second region diagnosis result data by respectively comparing the third and fourth output channel test data with the third and fourth reference channel test data.

In embodiments, each of the first region data and the second region data may be transferred in parallel through a first channel, a second channel, a third channel and a fourth channel. In such embodiments, the process circuit may include a first channel process circuit which performs the contrast enhancement process on the first region data transferred through the first channel based on the first region contrast enhancement coefficient in a first period in which the first region data are transferred, and performs the contrast enhancement process on the second region data transferred through the first channel based on the second region contrast enhancement coefficient in a second period in which the second region data are transferred, a second channel process circuit which performs the contrast enhancement process on the first region data transferred through the second channel based on the first region contrast enhancement coefficient in the first period, and performs the contrast enhancement process on the second region data transferred through the second channel based on the second region contrast enhancement coefficient in the second period, a third channel process circuit which performs the contrast enhancement process on the first region data transferred through the third channel based on the first region contrast enhancement coefficient in the first period, and performs the contrast enhancement process on the second region data transferred through the third channel based on the second region contrast enhancement coefficient in the second period, and a fourth channel process circuit which performs the contrast enhancement process on the first region data transferred through the fourth channel based on the first region contrast enhancement coefficient in the first period, and performs the contrast enhancement process on the second region data transferred through the fourth channel based on the second region contrast enhancement coefficient in the second period.

In embodiments, the input test data may include first through fourth input channel test data for the first through fourth channels with respect to the first display region, and fifth through eighth input channel test data for the fifth through eighth channels with respect to the second display region. In such embodiments, the reference test data may include first through eighth reference channel test data respectively corresponding to the first through eighth input channel test data. In such embodiments, in the diagnosis mode, the first through fourth channel process circuits may respectively generate first through fourth output channel test data as the output test data by performing the contrast enhancement process on the first through fourth input channel test data in the first period, and may respectively generate fifth through eighth output channel test data as the output test data by performing the contrast enhancement process on the fifth through eighth input channel test data in the second period. In such embodiments, the diagnosis circuit may generate, as the diagnosis result data, first region diagnosis result data by respectively comparing the first through fourth output channel test data with the first through fourth reference channel test data, and second region diagnosis result data by respectively comparing the fifth through eighth output channel test data with the fifth through eighth reference channel test data.

In embodiments, when the first region diagnosis result data represent that N-th output channel test data are different from N-th reference channel test data, and the second region diagnosis result data represent that (N+4)-th output channel test data are different from (N+4)-th reference channel test data, where N is 1, 2, 3 or 4, an N-th channel process circuit among the first through fourth channel process circuits may be determined to be faulty. In such embodiments, when the first region diagnosis result data represent that all of the first through fourth output channel test data are respectively different from the first through fourth reference channel test data, and the second region diagnosis result data represent that all of the fifth through eighth output channel test data are respectively equal to the fifth through eighth reference channel test data, the first region analysis circuit may be determined to be faulty. In such embodiments, when the first region diagnosis result data represent that all of the first through fourth output channel test data are respectively equal to the first through fourth reference channel test data, and the second region diagnosis result data represent that all of the fifth through eighth output channel test data are respectively different from the fifth through eighth reference channel test data, the second region analysis circuit may be determined to be faulty.

According to some embodiments, there is provided a contrast enhancement device included in a display device including a first display region and a second display region. In such embodiments, the contrast enhancement device includes a first region analysis circuit which generates a contrast enhancement coefficient for the first display region by analyzing input data for the first display region of the display device, a second region analysis circuit which generates the contrast enhancement coefficient for the second display region of the display device by analyzing the input data for the second display region, a first channel process circuit which performs a contrast enhancement process on the input data transferred through a first channel based on the contrast enhancement coefficient for the first and second display regions, a second channel process circuit which performs the contrast enhancement process on the input data transferred through a second channel based on the contrast enhancement coefficient for the first and second display regions, a third channel process circuit which performs the contrast enhancement process on the input data transferred through a third channel based on the contrast enhancement coefficient, a fourth channel process circuit which performs the contrast enhancement process on the input data transferred through a fourth channel based on the contrast enhancement coefficient for the first and second display regions, and a diagnosis circuit which outputs output image data generated by the first through fourth channel process circuits in a normal mode, and generates diagnosis result data for the first and second region analysis circuits and the first through fourth channel process circuits by comparing output test data generated by the first through fourth channel process circuits in a diagnosis mode.

According to some embodiments, there is provided a display device including a display panel including a plurality of pixels, a data driver which provides data signals to the plurality of pixels, a scan driver which provides scan signals to the plurality of pixels, and a controller which controls the data driver and the scan driver, and including a contrast enhancement device. In such embodiments, the contrast enhancement device includes an analysis circuit which receives input image data as input data in a normal mode, receives input test data as the input data in a diagnosis mode, and determines a contrast enhancement coefficient by analyzing the input data, a process circuit which generates output data by performing a contrast enhancement process on the input data based on the contrast enhancement coefficient, where the output data in the normal mode is output image data corresponding to the input image data, and the output data in the diagnosis mode is output test data corresponding to the input test data, and a diagnosis circuit which outputs the output image data in the normal mode, and generates diagnosis result data for the contrast enhancement device by comparing the output test data with reference test data in the diagnosis mode.

In embodiments of the invention, as described above, in a diagnosis mode, a contrast enhancement device and a display device including the contrast enhancement device may generate output test data by performing a contrast enhancement process on input test data, and may generate diagnosis result data for the contrast enhancement device by comparing the output test data with reference test data. Accordingly, a fault existence and a fault position of the contrast enhancement device may be identified or checked.

BRIEF DESCRIPTION OF THE DRAWINGS

Illustrative, non-limiting embodiments will be more clearly understood from the following detailed description taken in conjunction with the accompanying drawings.

FIG. 3A and FIG. 3B are diagrams for describing an example of an operation of an analysis circuit that determines a contrast enhancement coefficient.

FIG. 4A and FIG. 4B are diagrams for describing an example where a gain coefficient is applied by an analysis circuit.

FIG. 5 is a diagram for describing an example of an operation of a process circuit that performs a contrast enhancement process.

FIG. 10B is a diagram for describing an example of second region diagnosis result data for a second display region, and FIG. 10C is a diagram for describing examples of fault positions according to the first and second region diagnosis result data.

FIG. 14A is a diagram for describing an example of first region diagnosis result data for a first display region, FIG. 14B is a diagram for describing an example of second region diagnosis result data for a second display region, and FIG. 14C is a diagram for describing examples of fault positions according to the first and second region diagnosis result data.

DESCRIPTION OF EMBODIMENTS

Figure 1:
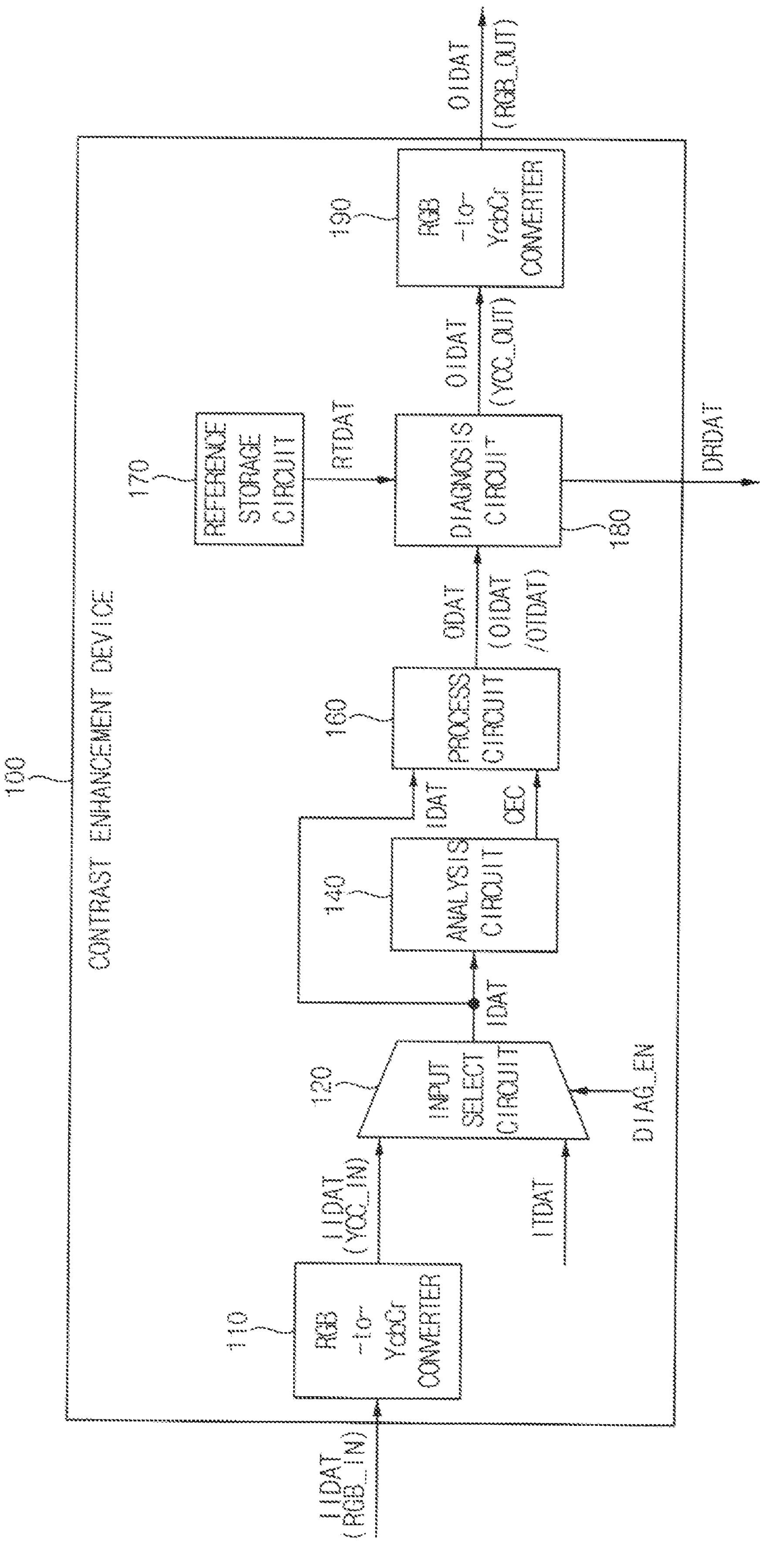
FIG. 1 is a block diagram illustrating a contrast enhancement device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Embodiments of the invention will be described more fully hereinafter with reference to the accompanying drawings.

Figure 2:
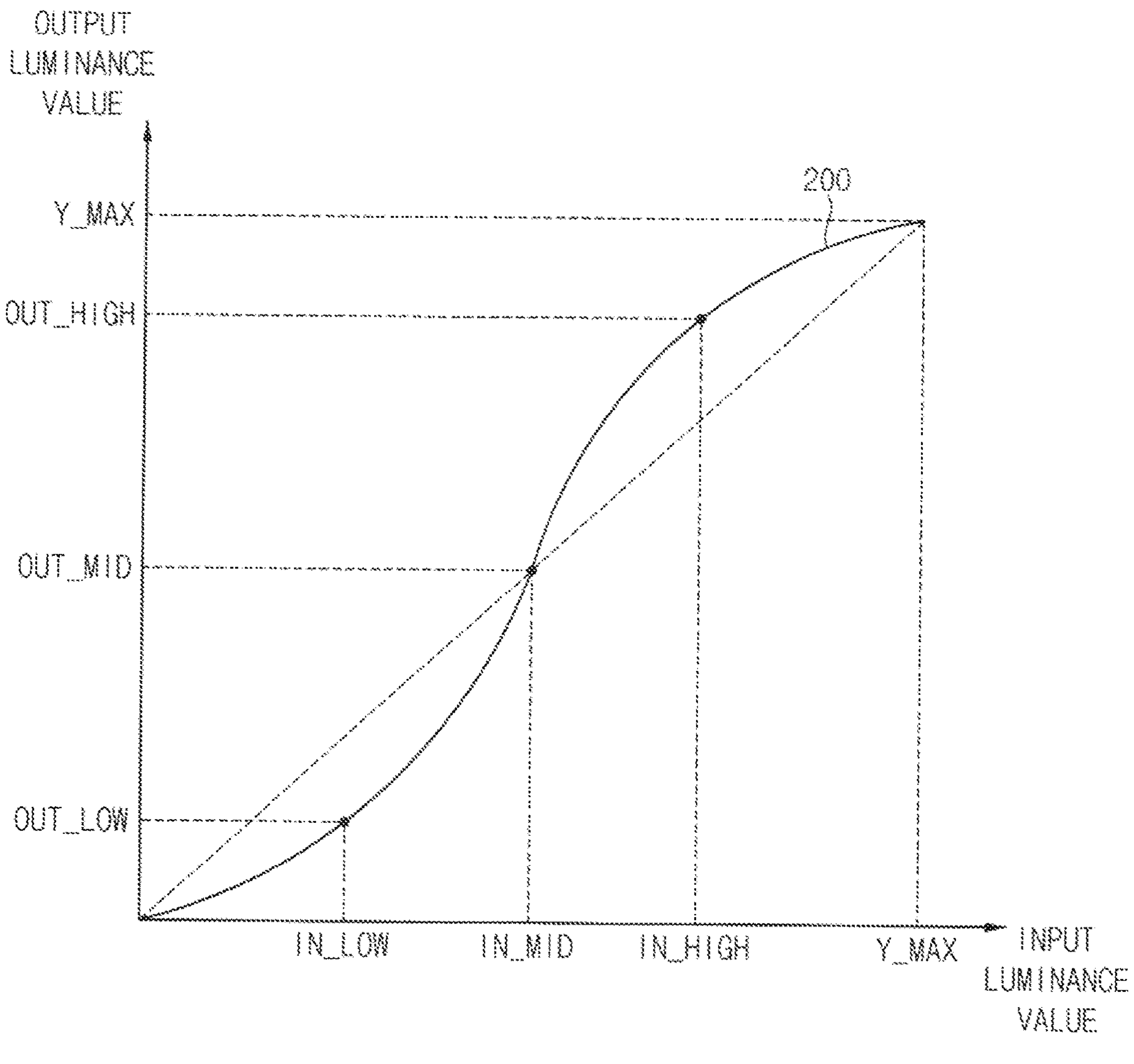
FIG. 2 is a diagram for describing an example of a contrast enhancement process performed by a contrast enhancement device.
Figure 3A:
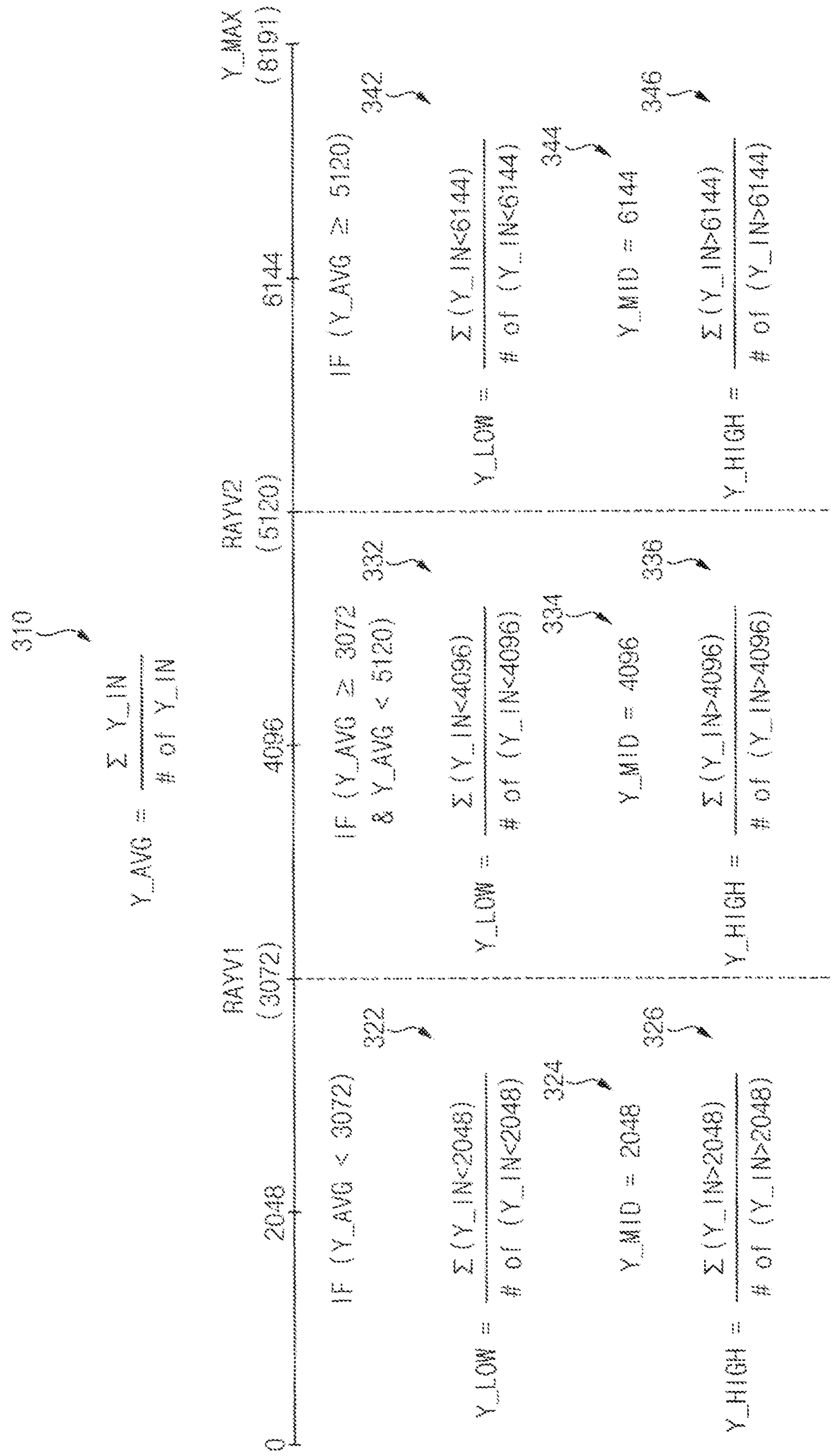
Figure 4B:
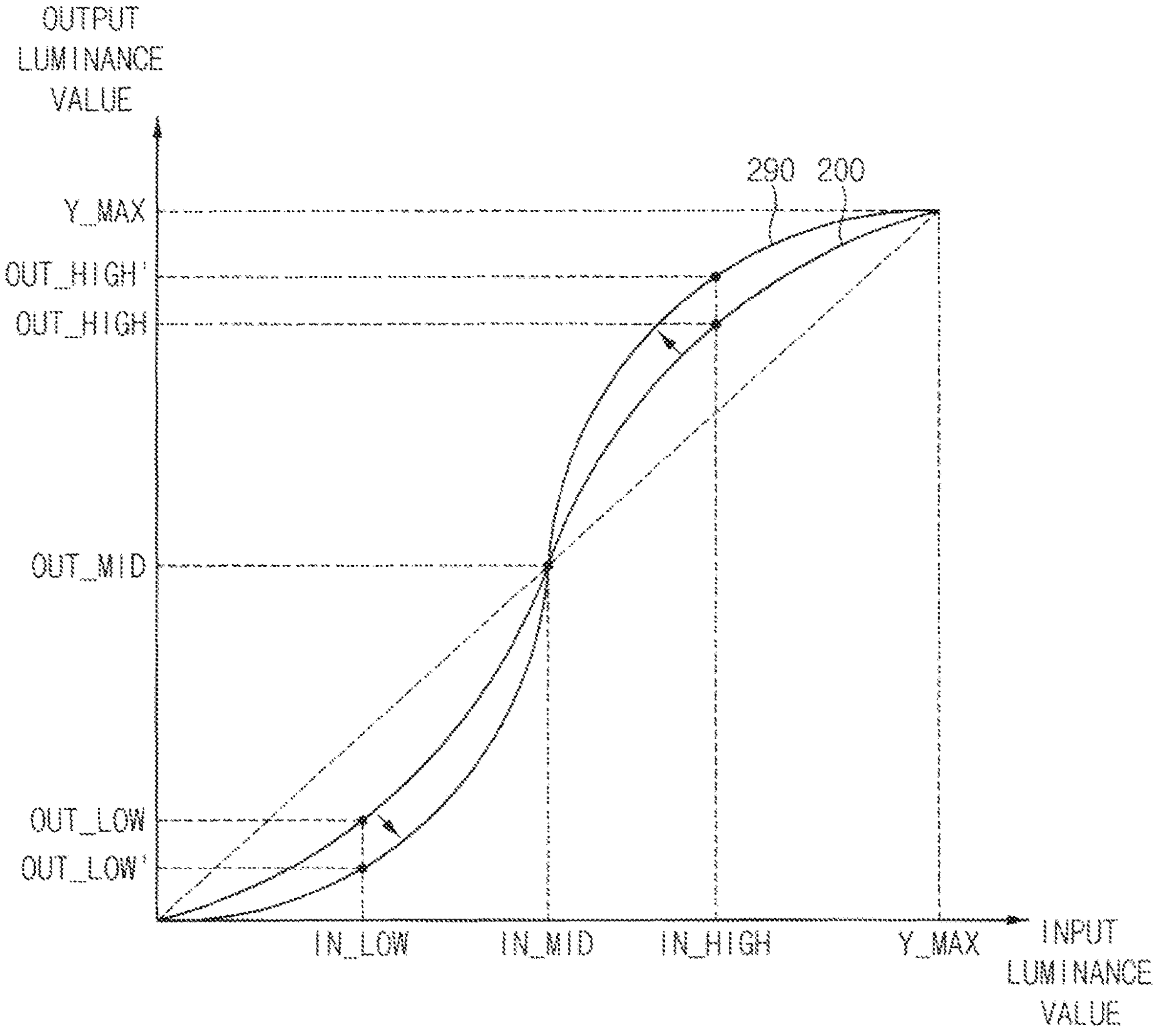

FIG. 1 is a block diagram illustrating a contrast enhancement device according to embodiments, FIG. 2 is a diagram for describing an example of a contrast enhancement process performed by a contrast enhancement device, FIG. 3A and FIG. 3B are diagrams for describing an example of an operation of an analysis circuit that determines a contrast enhancement coefficient, FIG. 4A and FIG. 4B are diagrams for describing an example where a gain coefficient is applied by an analysis circuit, and FIG. 5 is a diagram for describing an example of an operation of a process circuit that performs a contrast enhancement process.

Referring to FIG. 1, a contrast enhancement device 100 of a display device according to embodiments may include an analysis circuit 140, a process circuit 160 and a diagnosis circuit 180. In some embodiments, the contrast enhancement device 100 may further include an RGB-to-YCbCr converter 110, an input select circuit 120, a reference storage circuit 170 and an YCbCr-to-RGB converter 190.

The analysis circuit 140 may determine a contrast enhancement coefficient CEC for a contrast enhancement process by analyzing input data IDAT. The analysis circuit 140 may receive input image data IIDAT as the input data IDAT from an external host processor (e.g., an application processor (AP), a graphics processing unit (GPU) or a graphics card) in a normal mode, and may receive input test data ITDAT for a fault diagnosis operation of the contrast enhancement device 100 as the input data IDAT in a diagnosis mode.

In some embodiments, the input image data IIDAT received from the external host processor may be RGB data RGB_IN, and the contrast enhancement device 100 may include the RGB-to-YCbCr converter 110 that generates YCbCr data YCC_IN including luminance data (Y) and chrominance data (Cb and Cr) by performing an RGB-to-YCbCr conversion operation on the input image data IIDAT, and that provides the YCbCr data YCC_IN as the input image data IIDAT (through the input select circuit 120) to the analysis circuit 140. In an embodiment, for example, the YCbCr data YCC_IN may have, but not limited to, a luminance value (Y), a blue chrominance value (Cb) and a red chrominance value (Cr). In such embodiments, the input test data ITDAT for the fault diagnosis operation also may have, but not limited to, a predetermined luminance value, a predetermined blue chrominance value and a predetermined red chrominance value.

In some embodiments, for the analysis circuit 140 to receive the input image data IIDAT in the normal mode and to receive the input test data ITDAT in the diagnosis mode, the contrast enhancement device 100 may include the input select circuit 120 that selectively provides the input image data IIDAT or the input test data ITDAT as the input data IDAT to the analysis circuit 140 in response to a diagnosis enable signal DIAG_EN. In an embodiment, for example, the diagnosis enable signal DIAG_EN may have a first level in the normal mode, and the input select circuit 120 may provide the input image data IIDAT to the analysis circuit 140 in response to the diagnosis enable signal DIAG_EN having the first level. In such an embodiment, the diagnosis enable signal DIAG_EN may have a second level in the diagnosis mode, and the input select circuit 120 may provide the input test data ITDAT to the analysis circuit 140 in response to the diagnosis enable signal DIAG_EN having the second level.

The analysis circuit 140 may determine the contrast enhancement coefficient CEC for the contrast enhancement process by analyzing the input image data IIDAT in the normal mode, and may determine the contrast enhancement coefficient CEC for the contrast enhancement process by analyzing the input test data ITDAT in the diagnosis mode. In some embodiments, the contrast enhancement process may be a process that decreases a low gray level or a low luminance and increases a high gray level or a high luminance, and the contrast enhancement coefficient CEC may include coefficients or values for the contrast enhancement process. In an embodiment, for example, as illustrated in FIG. 2, the contrast enhancement process may be performed based on a curve 200 (e.g., an S-shaped curve 200) for generating an output luminance value lower than an input luminance value with respect to the input luminance value in a low gray region or a low luminance region and for generating an output luminance value lower than an input luminance value with respect to the input luminance value in a high gray region or a high luminance region, and the contrast enhancement coefficient CEC may include a low gray input luminance value IN_LOW, a middle gray input luminance value IN_MID, a high gray input luminance value IN_HIGH, a low gray output luminance value OUT_LOW, a middle gray output luminance value OUT_MID and a high gray output luminance value OUT_HIGH corresponding to three points of the curve 200.

In some embodiments, the analysis circuit 140 may determine an average luminance value, a low gray luminance value, a middle gray luminance value and a high gray luminance value of the input data IDAT to determine the contrast enhancement coefficient CEC by analyzing luminance values of the input data IDAT (e.g., the input image data IIDAT or the input test data ITDAT), and may determine, as the contrast enhancement coefficient CEC, the low gray, middle gray and high gray input luminance values IN_LOW, IN_MID and IN_HIGH and the low gray, middle gray and high gray output luminance values OUT_LOW, OUT_MID and OUT_HIGH based on the average luminance value, the low gray luminance value, the middle gray luminance value and the high gray luminance value of the input data IDAT.

In an embodiment, for example, as illustrated in FIG. 3A, the analysis circuit 140 may calculate the average luminance value Y_AVG of the input data IDAT by calculating an average value of the luminance values of the input data IDAT using equation 310: Y_AVG=ΣY_IN/# of Y_IN, as show in FIG. 3A. Here, Y_AVG may represent (or denote) the average luminance value of the input data IDAT, and Y_IN may represent each luminance value of the input data IDAT, or each input luminance value.

In a case where the average luminance value Y_AVG is lower than a first reference average luminance value RAYV1 (e.g., 3,072), the analysis circuit 140 may determine the low gray luminance value Y_LOW by calculating an average value of the luminance values lower than a first reference middle luminance value (e.g., 2,048) using equation 322: Y_LOW=Σ/(Y_IN<2048)/# of (Y_IN<2048). In this case, the analysis circuit 140 may determine the middle gray luminance value Y_MID as the first reference middle luminance value using equation 324: Y_MID=2048, and may determine the high gray luminance value Y_HIGH by calculating an average value of the luminance values higher than the first reference middle luminance value using equation 326: Y_HIGH=Σ(Y_IN>2048)/# of (Y_IN>2048). In these equations, Y_IN may represent each luminance value of the input data IDAT or each input luminance value, Y_LOW may represent the low gray luminance value, Y_MID may represent the middle gray luminance value, and Y_HIGH may represent the high gray luminance value.

In a case where the average luminance value is higher than or equal to the first reference average luminance value RAYV1 and is lower than a second reference average luminance value RAYV2 (e.g., 5,120), the analysis circuit 140 may determine the low gray luminance value Y_LOW by calculating an average value of the luminance values lower than a second reference middle luminance value (e.g., 4,096) using equation 332: Y_LOW=Σ(Y_IN<4096)/# of (Y_IN<4096). In this case, the analysis circuit 140 may determine the middle gray luminance value Y_MID as the second reference middle luminance value using equation 334: Y_MID=4096, and may determine the high gray luminance value Y_HIGH by calculating an average value of the luminance values higher than the second reference middle luminance value using equation 336: Y_HIGH=/(Y_IN>4096)/# of (Y_IN>4096). In a case where the average luminance value is higher than or equal to the second reference average luminance value RAYV2, the analysis circuit 140 may determine the low gray luminance value Y_LOW by calculating an average value of the luminance values lower than a third reference middle luminance value (e.g., 6,144) using equation 342: Y_LOW=Σ(Y_IN<6144)/# of (Y_IN<6144). In this case, the analysis circuit 140 may determine the middle gray luminance value Y_MID as the third reference middle luminance value using equation 344: Y_MID=6144, and may determine the high gray luminance value Y_HIGH by calculating an average value of the luminance values higher than the second reference middle luminance value using equation 346: Y_HIGH=Σ(Y_IN>6144)/# of (Y_IN>6144).

Although FIG. 3A illustrates examples of a maximum luminance value Y_MAX, the first and second reference average luminance values RAYV1 and RAYV2 and the first, second and third reference middle luminances in a case where each luminance value of the input data IDAT has thirteen bits, according to embodiments, each luminance value of the input data IDAT may have any number of bits, and the maximum luminance value Y_MAX, the first and second reference average luminance values RAYV1 and RAYV2 and the first, second and third reference middle luminances may be determined corresponding to the number of bits of each luminance value of the input data IDAT.

In an embodiment, for example, as illustrated in FIG. 3B, the analysis circuit 140 may determine the low gray input luminance value IN_LOW using equation: IN_LOW=Y_AVG/2, may determine the middle gray input luminance value IN_MID using equation: IN_MID=Y_AVG, and may determine the high gray input luminance value IN_HIGH using equation: IN_HIGH=(Y_MAX−Y_AVG)/2+Y_AVG. In such an embodiment, the analysis circuit 140 may determine the low gray output luminance value OUT_LOW using equation: OUT_LOW=IN_LOW−|(Y_LOW−IN_LOW)|, may determine the middle gray output luminance value OUT_MID using equation: OUT_MID=IN_MID, and may determine the high gray output luminance value OUT_HIGH using equation: OUT_HIGH=IN_HIGH+|(Y_HIGH−IN_HIGH)|. In these equations, IN_LOW may represent the low gray input luminance value, IN_MID may represent the middle gray input luminance value, IN_HIGH may represent the high gray input luminance value, Y_AVG may represent the average luminance value, Y_LOW may represent the low gray luminance value, Y_HIGH may represent the high gray luminance value, Y_MAX may represent a maximum luminance value of the input data IDAT or output data ODAT, OUT_LOW may represent the low gray output luminance value, OUT_MID may represent the middle gray output luminance value, and OUT_HIGH may represent the high gray output luminance value.

In this manner, the analysis circuit 140 may determine input and output luminance values IN_LOW, IN_MID, IN_HIGH, OUT_LOW, OUT_MID and OUT_HIGH suitable for the input data IDAT, for example the input and output luminance values IN_LOW, IN_MID, IN_HIGH, OUT_LOW, OUT_MID and OUT_HIGH corresponding to the curve 200 for the contrast enhancement process. Although FIGS. 3A and 3B illustrate an embodiment of an operation of the analysis circuit 140 that determines the input and output luminance values IN_LOW, IN_MID, IN_HIGH, OUT_LOW, OUT_MID and OUT_HIGH, the operation of the analysis circuit 140 is not limited to the example of FIGS. 3A and 3B.

In some embodiments, after determining the input and output luminance values IN_LOW, IN_MID, IN_HIGH, OUT_LOW, OUT_MID and OUT_HIGH, the analysis circuit 140 may change the output luminance values OUT_LOW, OUT_MID and OUT_HIGH (e.g., the low gray output luminance value OUT_LOW and the high gray output luminance value OUT_HIGH) using a gain coefficient. In some embodiments, the analysis circuit 140 may apply a gain coefficient to a difference between the low gray input luminance value IN_LOW and the low gray output luminance value OUT_LOW to determine the low gray output luminance value OUT_LOW' having an increased difference with respect to the low gray input luminance value IN_LOW In an embodiment, for example, as illustrated in FIG. 4A, the analysis circuit 140 may calculate a low gray luminance difference DIFF_LOW using equation 372: DIFF_LOW=IN_LOW−OUT_LOW, and may calculate the low gray output luminance value OUT_LOW' having the increased difference using equation 374:

OUT_LOW'=IN_LOW−(DIFF_LOW*GAIN). Here, IN_LOW may represent the low gray input luminance value, OUT_LOW may represent the low gray output luminance value, DIFF_LOW may represent the low gray luminance difference, GAIN may represent the gain coefficient, and OUT_LOW' may represent the low gray output luminance value having the increased difference. In such an embodiment, the analysis circuit 140 may apply the gain coefficient to a difference between the high gray input luminance value IN_HIGH and the high gray output luminance value OUT_HIGH to determine the high gray output luminance value OUT_HIGH' having an increased difference with respect to the high gray input luminance value IN_HIGH. In an embodiment, for example, as illustrated in FIG. 4A, the analysis circuit 140 may calculate a high gray luminance difference DIFF HIGH using equation 382: DIFF HIGH=OUT_HIGH−IN_HIGH, and may calculate the high gray output luminance value OUT_HIGH' having the increased difference using equation 384: OUT_HIGH'=IN_HIGH+(DIFF HIGH*GAIN). Here, IN_HIGH may represent the high gray input luminance value, OUT_HIGH may represent the high gray output luminance value, DIFF HIGH may represent the high gray luminance difference, GAIN may represent the gain coefficient, and OUT_HIGH' may represent the high gray output luminance value having the increased difference. In a case where the gain coefficient is applied, as illustrated in FIG. 4B, the low gray output luminance value OUT_LOW may be decreased to the low gray output luminance value OUT_LOW' having the increased difference, the high gray output luminance value OUT_HIGH may by increased to the high gray output luminance value OUT_HIGH' having the increased difference, and thus a curve 200 corresponding to the input and output luminance values IN_LOW, IN_MID, IN_HIGH, OUT_LOW, OUT_MID and OUT_HIGH may be changed to a curve 290 represented by input and output luminance values IN_LOW, IN_MID, IN_HIGH, OUT_LOW', OUT_MID and OUT_HIGH'.

Referring back to FIG. 1, the process circuit 160 may receive the contrast enhancement coefficient CEC from the analysis circuit 140, and may generate output data ODAT by performing the contrast enhancement process on the input data IDAT based on the contrast enhancement coefficient CEC. In some embodiments, the process circuit 160 may receive, as the contrast enhancement coefficient CEC, the low gray input luminance value IN_LOW, the middle gray input luminance value IN_MID, the high gray input luminance value IN_HIGH, the low gray output luminance value OUT_LOW, the middle gray output luminance value OUT_MID and the high gray output luminance value OUT_ HIGH from the analysis circuit 140, may determine a conversion difference value with respect to each luminance value of the input data IDAT by using the low gray input luminance value IN_LOW, the middle gray input luminance value IN_MID, the high gray input luminance value IN_HIGH, the low gray output luminance value OUT_LOW, the middle gray output luminance value OUT_MID and the high gray output luminance value OUT_HIGH, and may calculate an output luminance value of the output data ODAT corresponding to the luminance value of the input data IDAT by adding the conversion difference value to the luminance value of the input data IDAT.

In an embodiment, for example, as illustrated in FIG. 5, with respect to each luminance value of the input data IDAT lower than the middle gray input luminance value IN_MID, the process circuit 160 may determine the conversion difference value CONV_DIFF for the luminance value using equation 410: CONV_DIFF=2*(OUT_LOW−IN_LOW)*Y_IN/IN_LOW−(OUT_LOW-IN_LOW)*(Y_IN)^2/(IN_LOW)^2. Here, CONV_DIFF may represent the conversion difference value, OUT_LOW may represent the low gray output luminance value, IN_LOW may represent the low gray input luminance value, and Y_IN may represent the luminance value of the input data IDAT. In such an embodiment, with respect to each luminance value of the input data IDAT higher than the middle gray input luminance value IN_MID, the process circuit 160 may determine the conversion difference value CONV_DIFF for the luminance value using equation 430: CONV_DIFF=2*(OUT_HIGH−IN_HIGH)*(Y_IN−IN_MID)/(IN_HIGH−IN_MID)−(OUT_HIGH−IN_HIGH)*(Y_IN−IN_MID)^2/(IN_HIGH−IN_MID)^2. Here, CONV_DIFF may represent the conversion difference value, OUT_HIGH may represent the high gray output luminance value, IN_HIGH may represent the high gray input luminance value, Y_IN may represent the luminance value of the input data IDAT, and IN_MID may represent the middle gray input luminance value. With respect to each luminance value of the input data IDAT being equal to the middle gray input luminance value IN_MID, the process circuit 160 may determine the conversion difference value as zero (or 0) using equation 450: CONV_DIFF=0. In such an embodiment, the process circuit 160 may calculate the output luminance value Y_OUT corresponding to the luminance value of the input data IDAT using equation 470: Y_OUT=Y_IN+CONV_DIFF. Here, Y_OUT may represent the output luminance value, Y_IN may represent the luminance value of the input data IDAT, and CONV_DIFF may represent the conversion difference value. Accordingly, the contrast enhancement process corresponding to the curve 200 of FIG. 2 may be performed.

In the normal mode, the process circuit 160 may receive the input image data IIDAT as the input data IDAT, and may generate output image data OIDAT corresponding to the input image data IIDAT as the output data ODAT by performing the contrast enhancement process on the input image data IIDAT. Further, in the diagnosis mode, the process circuit 160 may receive the input test data ITDAT as the input data IDAT, and may generate output test data OTDAT corresponding to the input test data ITDAT as the output data ODAT by performing the contrast enhancement process on the input test data ITDAT.

Figure 6:
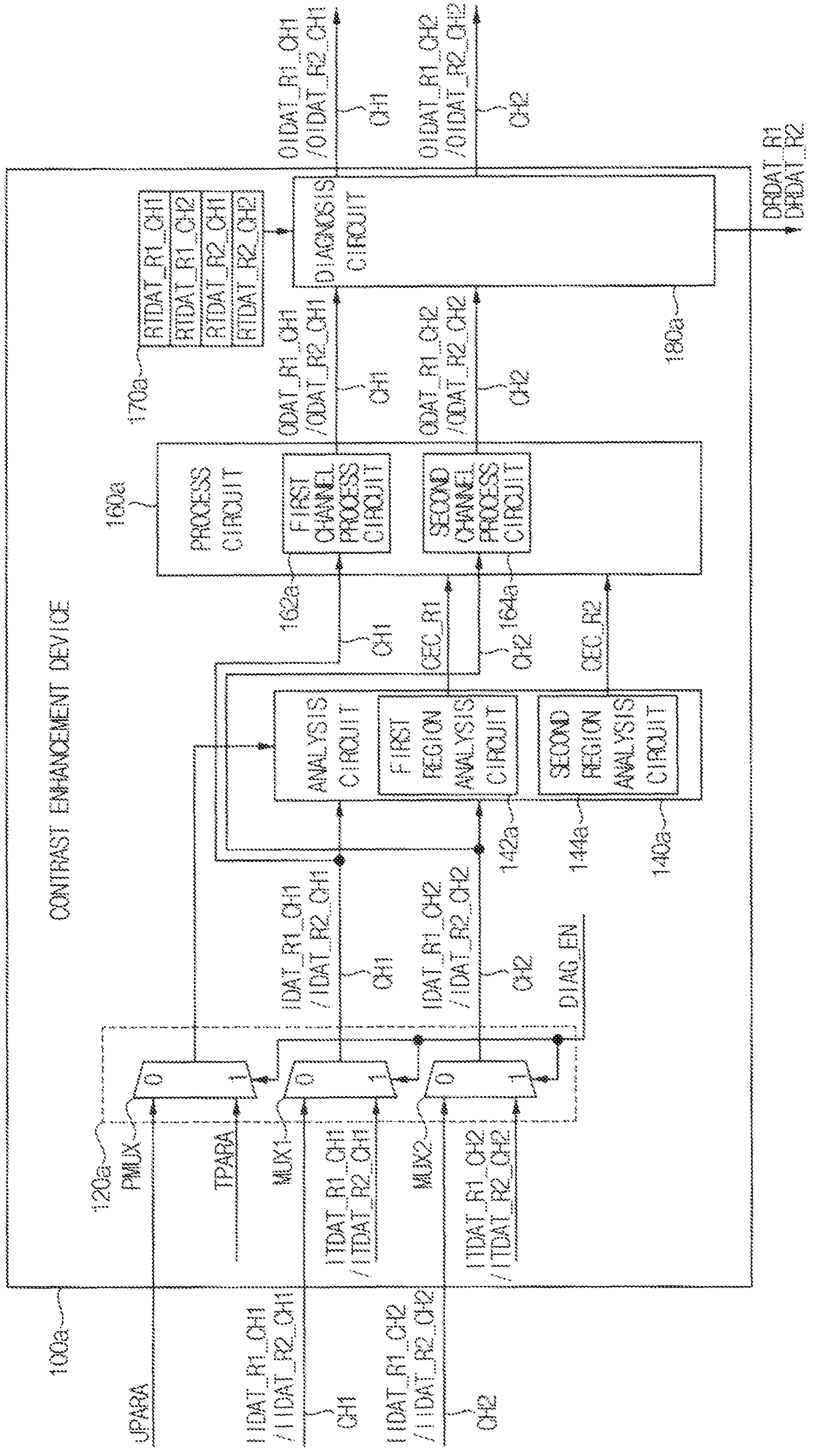
FIG. 6 is a block diagram illustrating a contrast enhancement device according to embodiments.
Figure 11:
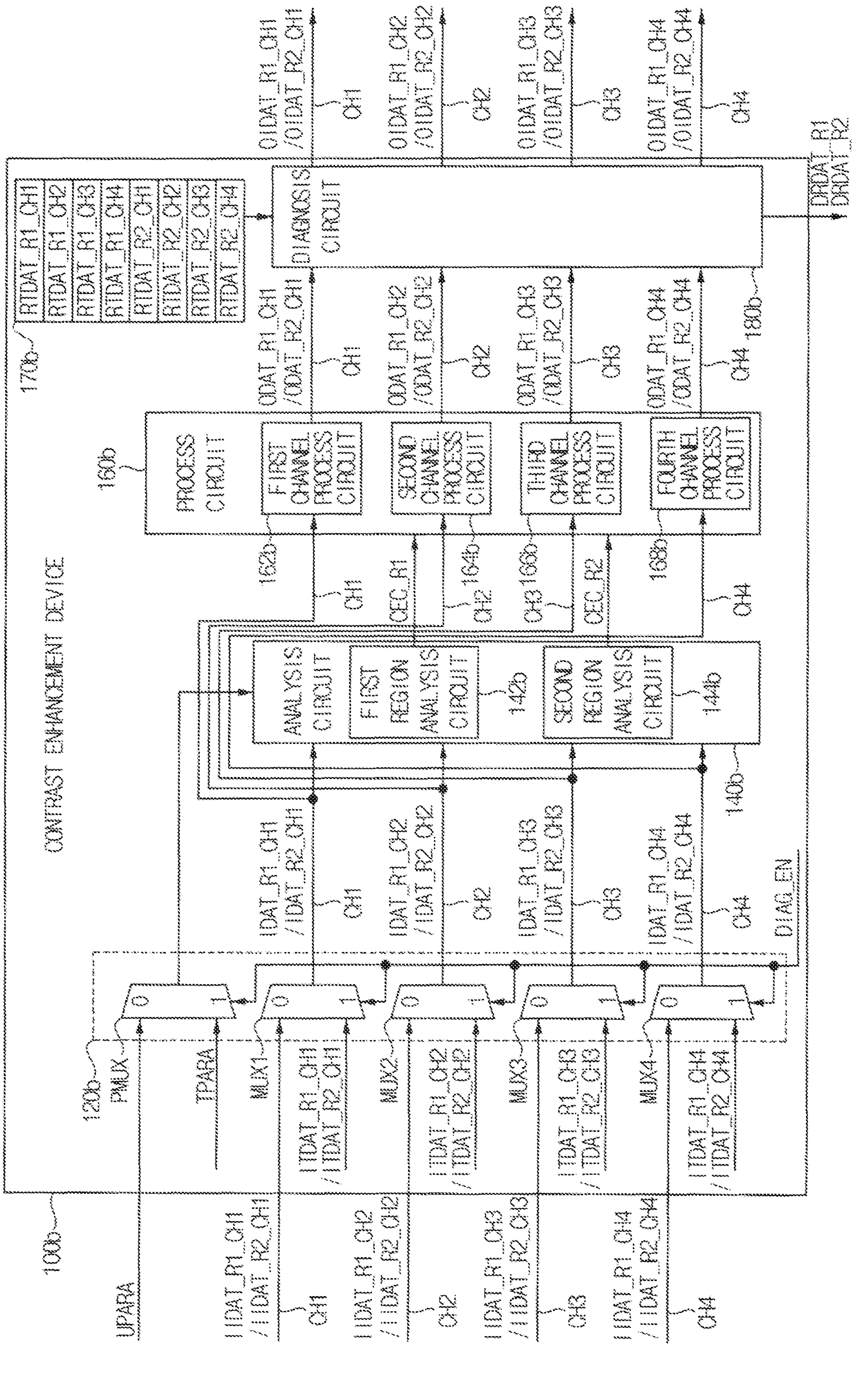
FIG. 11 is a block diagram illustrating a contrast enhancement device according to embodiments.

In some embodiments, the process circuit 160 may sequentially receive the input data IDAT through a single channel, and may sequentially perform the contrast enhancement process on the input data IDAT. In alternative embodiments, as illustrated in FIGS. 6 and 11, the input data IDAT may be transferred in parallel through a plurality of channels, and the process circuit 160 may include a plurality of channel process circuits that perform the contrast enhancement process for the plurality of channels in parallel.

In the normal mode, the diagnosis circuit 180 may receive the output image data OIDAT from the process circuit 160, and may output the output image data OIDAT as it is (or without performing any conversion thereto). In some embodiments, the output image data OIDAT output from the process circuit 160 or the diagnosis circuit 180 may be YCbCr data YCC_OUT, and the contrast enhancement device 100 may include the YCbCr-to-RGB converter 190 that generates RGB data RGB_OUT by performing an YCbCr-to-RGB conversion operation on the output image data OIDAT that are the YCbCr data YCC_OUT.

The output image data OIDAT that are the RGB data RGB_OUT generated by the YCbCr-to-RGB converter 190 may be provided to a data driver of the display device.

In the diagnosis mode, the diagnosis circuit 180 may receive the output test data OTDAT from the process circuit 160, and may generate diagnosis result data DRDAT for the contrast enhancement device 100 by comparing the output test data OTDAT with reference test data RTDAT. In some embodiments, the contrast enhancement device 100 may include the reference storage circuit 170 that stores the reference test data RTDAT that are previously determined with respect to the input test data ITDAT, and the diagnosis circuit 180 may generate the diagnosis result data DRDAT by comparing the output test data OTDAT with the reference test data RTDAT stored in the reference storage circuit 170. In an embodiment, for example, the reference test data RTDAT may be previously determined as the output test data OTDAT in a case where the contrast enhancement process is normally performed with respect to the input test data ITDAT. In such an embodiment, the diagnosis result data DRDAT may represent whether the output test data OTDAT are substantially the same as or different from the reference test data RTDAT. In a case where the diagnosis result data DRDAT indicate that the output test data OTDAT are substantially the same as the reference test data RTDAT, it may be determined that the contrast enhancement device 100 normally operates, or that a fault does not occurs in the contrast enhancement device 100. Further, in a case where the diagnosis result data DRDAT indicate that the output test data OTDAT are different from the reference test data RTDAT, it may be determined that the contrast enhancement device 100 does not normally operate, or that a fault occurs in the contrast enhancement device 100. Thus, based on the reference test data RTDAT, it may be determined whether the fault exists or does not exist in the contrast enhancement device 100. Further, in some embodiments, as described below with reference to FIG. 6 or FIG. 11, the analysis circuit 140 may include a plurality of region analysis circuits, the process circuit 160 may include a plurality of channel process circuits, and, not only the fault existence of the contrast enhancement device 100, but also a fault position, or which one of the plurality of region analysis circuits and the plurality of channel process circuits has the fault may be determined based on the reference test data RTDAT.

As described above, in the diagnosis mode, the contrast enhancement device 100 according to embodiments may generate the output test data OTDAT by performing the contrast enhancement process on the input test data ITDAT, and may generate the diagnosis result data DRDAT for the contrast enhancement device 100 by comparing the output test data OTDAT with the reference test data RTDAT. Accordingly, the fault existence and the fault position of the contrast enhancement device 100 may be identified or checked.

Figure 7A:
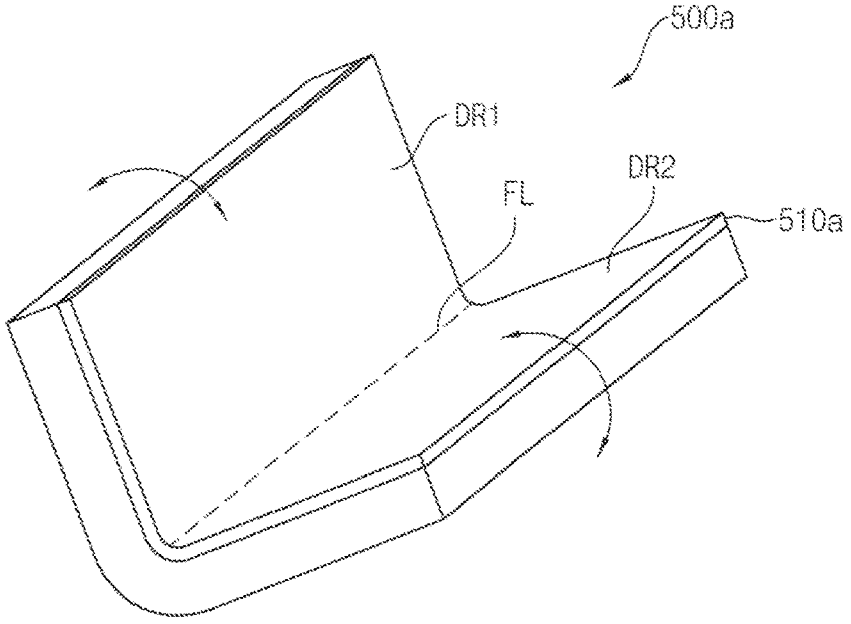
FIGS. 7A and 7B are diagrams illustrating embodiments of a foldable display device including a contrast enhancement device.
Figure 7B:
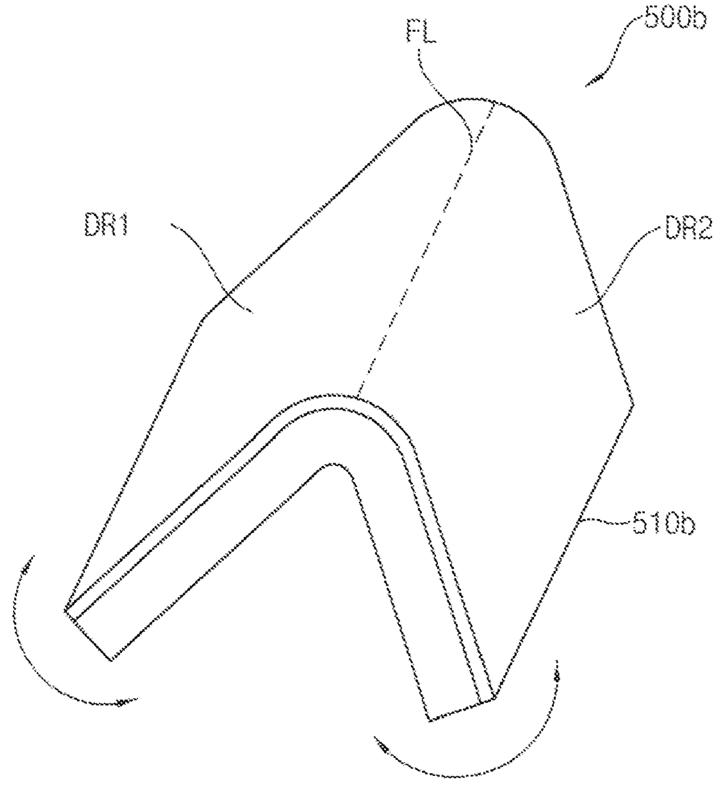
Figure 8A:
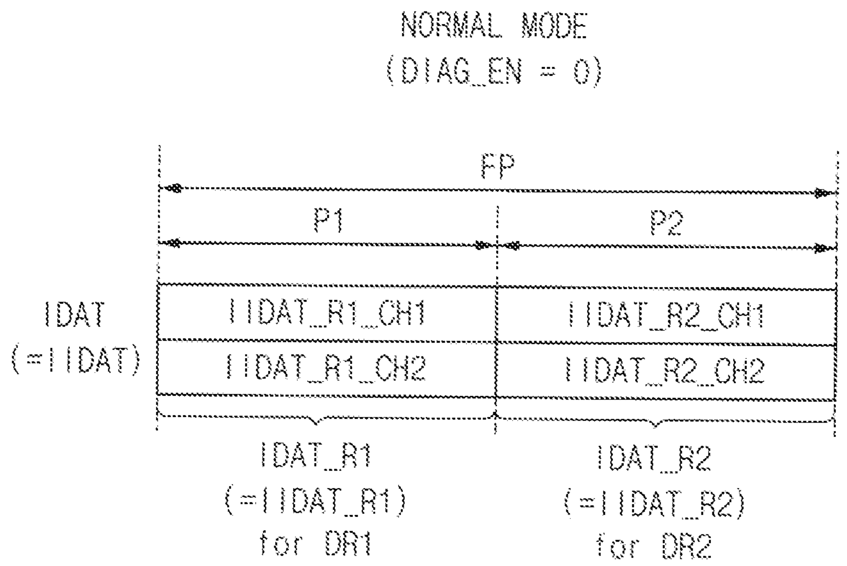
FIG. 8A is a diagram illustrating an example of input data in a normal mode.
Figure 8B:
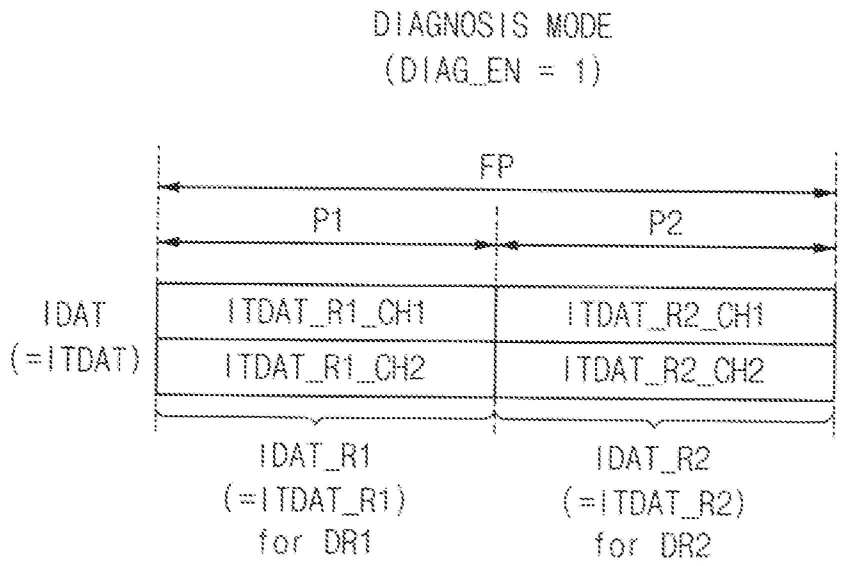
FIG. 8B is a diagram illustrating an example of input data in a diagnosis mode.
Figures 9, 10A:
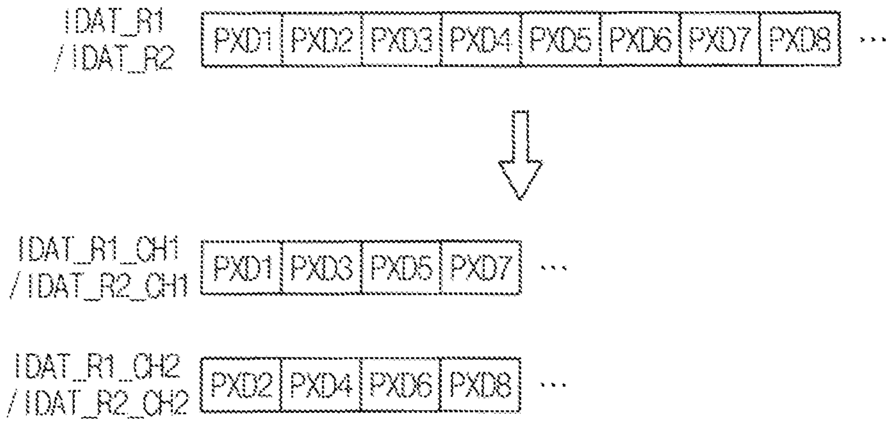
FIG. 9 is a diagram for describing an example of input data transferred through first and second channels.
FIG. 10A is a diagram for describing an example of first region diagnosis result data for a first display region.

FIG. 6 is a block diagram illustrating a contrast enhancement device according to embodiments, FIGS. 7A and 7B are diagrams illustrating embodiments of a foldable display device including a contrast enhancement device, FIG. 8A is a diagram illustrating an example of input data in a normal mode, FIG. 8B is a diagram illustrating an example of input data in a diagnosis mode, FIG. 9 is a diagram for describing an example of input data transferred through first and second channels, FIG. 10A is a diagram for describing an example of first region diagnosis result data for a first display region, FIG. 10B is a diagram for describing an example of second region diagnosis result data for a second display region, and FIG. 10C is a diagram for describing examples of fault positions according to the first and second region diagnosis result data.

Referring to FIG. 6, a contrast enhancement device 100*a* of a display device according to embodiments may include an input select circuit 120*a*, an analysis circuit 140*a*, a process circuit 160*a*, a reference storage circuit 170*a* and a diagnosis circuit 180*a*. In some embodiments, the contrast enhancement device 100*a* may further include an RGB-to-YCbCr converter that performs an RGB-to-YCbCr conversion operation on input image data, and an YCbCr-to-RGB converter that performs an YCbCr-to-RGB conversion operation on output image data.

The display device includes a display panel having a plurality of display regions. In some embodiments, the display device may be a foldable display device including a foldable display panel having a first display region and a second display region divided by a folding line, and each of the first display region and the second display region may be selectively activated. In an embodiment, for example, as illustrated in FIG. 7A, the display device may be an in-folding display device 500*a* that is folded at the folding line FL in a way such that the first and second display regions DR1 and DR2 may face each other. In an alternative embodiment, for example, as illustrated in FIG. 7B, the display device may be an out-folding display device 500*b* that is folded at the folding line FL in a way such that one of the first and second display regions DR1 and DR2 is located at a front side and the other one of the first and second display regions DR1 and DR2 is located at a back or rear side.

Input data provided to the analysis circuit 140*a* may include first region data for the first display region DR1 and second region data for the second display region DR2. The analysis circuit 140*a* may receive the first region data in a first period of a frame period, and may receive the second region data in a second period of the frame period. In the normal mode, as illustrated in FIG. 8A, the analysis circuit 140*a* may receive input image data IIDAT as the input data IDAT. In an embodiment, for example, the analysis circuit 140*a* may receive the input image data IIDAT_R1 for the first display region DR1 as the first region data IDAT_R1 for the first display region DR1 in a first period P1 of the frame period FP, and may receive the input image data IIDAT_R2 for the second display region DR2 as the second region data IDAT_R2 for the second display region DR2 in a second period P2 of the frame period FP. In such an embodiment, in the diagnosis mode, as illustrated in FIG. 8B, the analysis circuit 140*a* may receive input test data ITDAT as the input data IDAT. In an embodiment, for example, the analysis circuit 140*a* may receive the input test data ITDAT_R1 for the first display region DR1 as the first region data IDAT_R1 for the first display region DR1 in the first period P1 of the frame period FP, and may receive the input test data ITDAT_R2 for the second display region DR2 as the second region data IDAT_R2 for the second display region DR2 in the second period P2 of the frame period FP.

In an embodiment, the input data IDAT, or each of the first region data IDAT_R1 and the second region data IDAT_R2 may be transferred in parallel through a plurality of channels CH1 and CH2. In some embodiments, each of the first region data IDAT_R1 and the second region data IDAT_R2 may be transferred in parallel through a first channel CH1 and a second channel CH2. In an embodiment, for example, as illustrated in FIG. 9, the input data IDAT or each region data IDAT_R1/DAT_R2 may sequentially include first, second, third, fourth, fifth, sixth, seventh and eighth pixel data PXD1, PXD2, PXD3, PXD4, PXD5, PXD6, PXD7 and PXD8. In such an embodiment, each region data IDAT_R1_CH1/IDAT_R2_CH1 transferred through the first channel CH1 may include the first, third, fifth and seventh pixel data PXD1, PXD3, PXD5 and PXD7, each region data IDAT_R1_CH2/IDAT_R2_CH2 transferred through the second channel CH2 may include the second, fourth, sixth and eighth pixel data PXD2, PXD4, PXD6 and PXD8, and each region data IDAT_R1/IDAT_R2 may be transferred in parallel through the first channel CH1 and the second channel CH2.

Referring back to FIG. 6, for the analysis circuit 140*a* to receive the input image data IIDAT_R1_CH1, IIDAT_R1_CH2, IIDAT_R2_CH1 and IIDAT_R2_CH2 in the normal mode and to receive the input test data ITDAT_R1_CH1, ITDAT_R1_CH2, ITDAT_R2_CH1 and ITDAT_R2_CH2 in the diagnosis mode, the input select circuit 120*a* may selectively provide the input image data IIDAT_R1_CH1, IIDAT_R1_CH2, IIDAT_R2_CH1 and IIDAT_R2_CH2 or the input test data ITDAT_R1_CH1, ITDAT_R1_CH2, ITDAT_R2_CH1 and ITDAT_R2_CH2 to the analysis circuit 140*a* in response to a diagnosis enable signal DIAG_EN. In an embodiment, for example, the input select circuit 120*a* may include a first multiplexer MUX1 for selectively providing the input data IDAT_R1_CH1 and IDAT_R2_CH1 for the first channel CH1, and a second multiplexer MUX2 for selectively providing the input data IDAT_R1_CH2 and IDAT_R2_CH2 for the second channel CH2. With respect to the first channel CH1, the first multiplexer MUX1 may select the input image data IIDAT_R1_CH1 and IIDAT_R2_CH1 as the input data IDAT_R1_CH1 and IDAT_R2_CH1 in response to the diagnosis enable signal DIAL EN having a value of 0, and may select the input test data ITDAT_R1_CH1 and ITDAT_R2_CH1 as the input data IDAT_R1_CH1 and IDAT_R2_CH1 in response to the diagnosis enable signal DIAL EN having a value of 1. Further, with respect to the second channel CH2, the second multiplexer MUX2 may select the input image data IIDAT_R1_CH2 and IIDAT_R2_CH2 as the input data IDAT_R1_CH2 and IDAT_R2_CH2 in response to the diagnosis enable signal DIAG_EN having the value of 0, and may select the input test data ITDAT_R1_CH2 and ITDAT_R2_CH2 as the input data IDAT_R1_CH2 and IDAT_R2_CH2 in response to the diagnosis enable signal DIAG_EN having the value of 1.

In some embodiments, the input select circuit 120*a* may further include a parameter multiplexer PMUX for a parameter selection. In an embodiment, for example, the parameter multiplexer PMUX may select a user parameter UPARA in response to the diagnosis enable signal DIAG_EN having the value of 0, and may select a test parameter TPARA in response to the diagnosis enable signal DIAG_EN having the value of 1. In some embodiments, the user parameter UPARA may be determined by a user or a host processor, and the test parameter TPARA may be previously determined for a fault diagnosis operation. In an embodiment, for example, each of the user parameter UPARA and the test parameter TPARA may include, but not limited to, a gain coefficient, a vertical resolution, a horizontal resolution, etc.

The analysis circuit 140*a* may include a first region analysis circuit 142*a* that generates a first region contrast enhancement coefficient CEC R1 for the first display region DR1 by analyzing the first region data IDAT_R1_CH1 and IDAT_R1_CH2, and a second region analysis circuit 144*a* that generates a second region contrast enhancement coefficient CEC_R2 for the second display region DR2 by analyzing the second region data IDAT_R2_CH1 and IDAT_R2_CH2. In an embodiment, for example, in the first period P1 of the frame period FP, the first region analysis circuit 142*a* may receive the first region data IDAT_R1_CH1 and IDAT_R1_CH2 through the first channel CH1 and the second channel CH2, and may generate the first region contrast enhancement coefficient CEC R1 by analyzing the first region data IDAT_R1_CH1 and IDAT_R1_CH2. In such an embodiment, in the second period P2 of the frame period FP, the second region analysis circuit 144*a* may receive the second region data IDAT_R2_CH1 and IDAT_R2_CH2 through the first channel CH1 and the second channel CH2, and may generate the second region contrast enhancement coefficient CEC_R2 by analyzing the second region data IDAT_R2_CH1 and IDAT_R2_CH2.

The process circuit 160*a* may include a first channel process circuit 162*a* for the first channel CH1 and a second channel process circuit 164*a* for the second channel CH2. In an embodiment, the first channel process circuit 162*a* may generate first region output data ODAT_R1_CH1 by performing a contrast enhancement process on the first region data IDAT_R1_CH1 transferred through the first channel CH1 based on the first region contrast enhancement coefficient CEC R1 in the first period P1 of each frame period FP, and may generate second region output data ODAT_R2_CH1 by performing the contrast enhancement process on the second region data IDAT_R2_CH1 transferred through the first channel CH1 based on the second region contrast enhancement coefficient CEC_R2 in the second period P2 of each frame period FP. In such an embodiment, the second channel process circuit 164*a* may generate the first region output data ODAT_R1_CH2 by performing the contrast enhancement process on the first region data IDAT_R1_CH2 transferred through the second channel CH2 based on the first region contrast enhancement coefficient CEC R1 in the first period P1 of each frame period FP, and may generate the second region output data ODAT_R2_CH2 by performing the contrast enhancement process on the second region data IDAT_R2_CH2 transferred through the second channel CH2 based on the second region contrast enhancement coefficient CEC_R2 in the second period P2 of each frame period FP.

In the normal mode, the diagnosis circuit 180*a* may output the output data ODAT_R1_CH1, ODAT_R1_CH2, ODAT_R2_CH1 and ODAT_R2_CH2 received from the first and second channel process circuits 162*a* and 164*a*, or output image data OIDAT_R1_CH1, OIDAT_R1_CH2, OIDAT_R2_CH1 and OIDAT_R2_CH2.

In an embodiment of the contrast enhancement device 100*a* illustrated in FIG. 6, the input test data ITDAT may include first and second input channel test data ITDAT_R1_CH1 and ITDAT_R1_CH2 for the first and second channels CH1 and CH2 with respect to the first display region DR1, and third and fourth input channel test data ITDAT_R2_CH1 and ITDAT_R2_CH2 for the first and second channels CH1 and CH2 with respect to the second display region DR2. In the diagnosis mode, the first and second channel process circuits 162*a* and 164*a* may respectively generate first and second output channel test data OTDAT_R1_CH1 and OTDAT_R1_CH2 by performing the contrast enhancement process on the first and second input channel test data ITDAT_R1_CH1 and ITDAT_R1_CH2 in the first period P1, and may respectively generate third and fourth output channel test data OTDAT_R2_CH1 and OTDAT_R2_CH2 by performing the contrast enhancement process on the third and fourth input channel test data ITDAT_R2_CH1 and ITDAT_R2_CH2 in the second period P2. The reference storage circuit 170*a* may store first through fourth reference channel test data RTDAT_R1_CH1, RTDAT_R1_CH2, RTDAT_R2_CH1 and RTDAT_R2_CH2 respectively corresponding to the first through fourth input channel test data ITDAT_R1_CH1, ITDAT_R1_CH2, ITDAT_R2_CH1 and ITDAT_R2_CH2. The diagnosis circuit 180*a* may generate first region diagnosis result data DRDAT_R1 by respectively comparing the first and second output channel test data OTDAT_R1_CH1 and OTDAT_R1_CH2 with the first and second reference channel test data RTDAT_R1_CH1 and RTDAT_R1_CH2, and may generate second region diagnosis result data DRDAT_R2 by respectively comparing the third and fourth output channel test data OTDAT_R2_CH1 and OTDAT_R2_CH2 with the third and fourth reference channel test data RTDAT_R2_CH1 and RTDAT_R2_CH2.

In some embodiments, as illustrated in FIG. 10A, the diagnosis circuit 180*a* may generate a first bit B1 of the first region diagnosis result data DRDAT_R1 by comparing the first output channel test data OTDAT_R1_CH1 with the first reference channel test data RTDAT_R1_CH1, and may generate a second bit B2 of the first region diagnosis result data DRDAT_R1 by comparing the second output channel test data OTDAT_R1_CH2 with the second reference channel test data RTDAT_R1_CH2. In an embodiment, for example, the first bit B1 of the first region diagnosis result data DRDAT_R1 may have a value of '1' in a case where the first output channel test data OTDAT_R1_CH1 are substantially the same as the first reference channel test data RTDAT_R1_CH1, and may have a value of '0' in a case where the first output channel test data OTDAT_R1_CH1 are different from the first reference channel test data RTDAT_R1_CH1. In such an embodiment, the second bit B2 of the first region diagnosis result data DRDAT_R1 may have a value of '1' in a case where the second output channel test data OTDAT_R1_CH2 are substantially the same as the second reference channel test data RTDAT_R1_CH2, and may have a value of '0' in a case where the second output channel test data OTDAT_R1_CH2 are different from the second reference channel test data RTDAT_R1_CH2.

In an embodiment, as illustrated in FIG. 10B, the diagnosis circuit 180*a* may generate a first bit B1 of the second region diagnosis result data DRDAT_R2 by comparing the third output channel test data OTDAT_R2_CH1 with the third reference channel test data RTDAT_R2_CH1, and may generate a second bit B2 of the second region diagnosis result data DRDAT_R2 by comparing the fourth output channel test data OTDAT_R2_CH2 with the fourth reference channel test data RTDAT_R2_CH2. In an embodiment, for example, the first bit B1 of the second region diagnosis result data DRDAT_R2 may have a value of '1' in a case where the third output channel test data OTDAT_R2_CH1 are substantially the same as the third reference channel test data RTDAT_R2_CH1, and may have a value of '0' in a case where the third output channel test data OTDAT_R2_CH1 are different from the third reference channel test data RTDAT_R2_CH1. In such an embodiment, the second bit B2 of the second region diagnosis result data DRDAT_R2 may have a value of '1' in a case where the fourth output channel test data OTDAT_R2_CH2 are substantially the same as the fourth reference channel test data RTDAT_R2_CH2, and may have a value of '0' in a case where the fourth output channel test data OTDAT_R2_CH2 are different from the fourth reference channel test data RTDAT_R2_CH2.

A fault existence and a fault position of the contrast enhancement device 100*a* may be identified or checked based on the first and second region diagnosis result data DRDAT_R1 and DRDAT_R2. In an embodiment, for example, as illustrated in FIG. 10C, in a case where the first region diagnosis result data DRDAT_R1 have a value of '01', and the second region diagnosis result data DRDAT_R2 have a value of '01', it may be determined that the fault position is the first channel process circuit 162*a*. In such an embodiment, in a case where the first region diagnosis result data DRDAT_R1 have a value of '10', and the second region diagnosis result data DRDAT_R2 have a value of '10', it may be determined that the fault position is the second channel process circuit 164*a*. In such an embodiment, in a case where the first region diagnosis result data DRDAT_R1 have a value of '00, and the second region diagnosis result data DRDAT_R2 have a value of '11', it may be determined that the fault position is the first region analysis circuit 142*a*. In such an embodiment, in a case where the first region diagnosis result data DRDAT_R1 have a value of '11, and the second region diagnosis result data DRDAT_R2 have a value of '00', it may be determined that the fault position is the second region analysis circuit 144*a*.

Figure 12A:
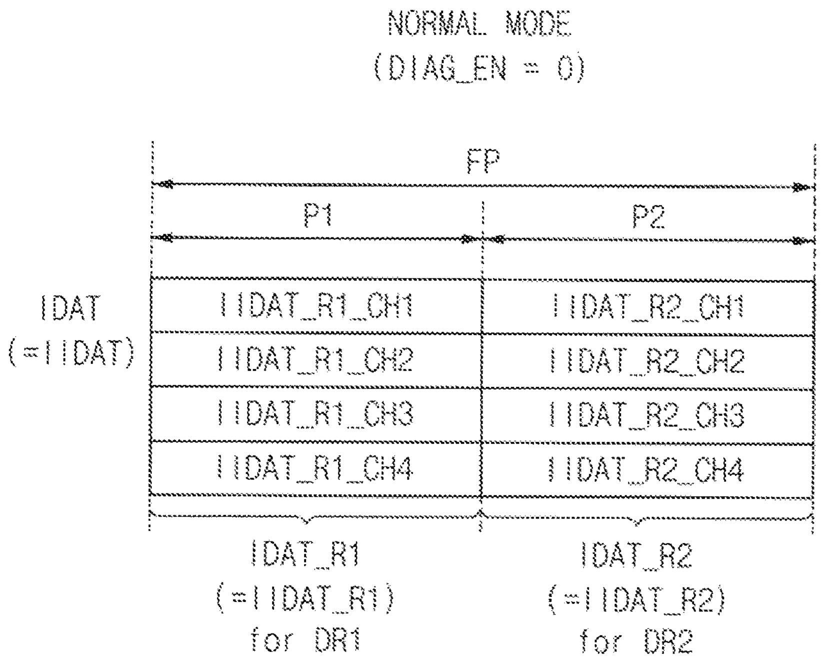
FIG. 12A is a diagram illustrating an example of input data in a normal mode.
Figure 12B:
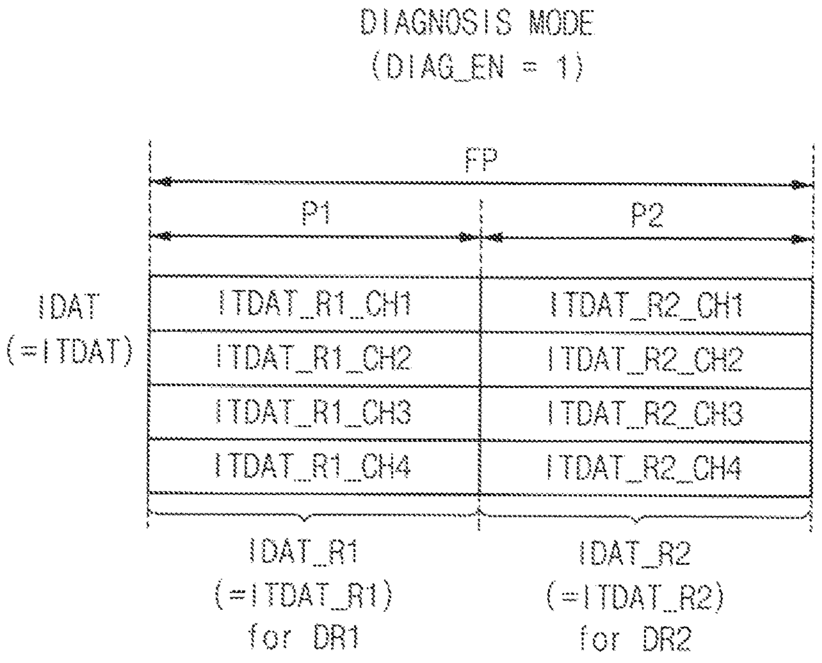
FIG. 12B is a diagram illustrating an example of input data in a diagnosis mode.
Figure 13:
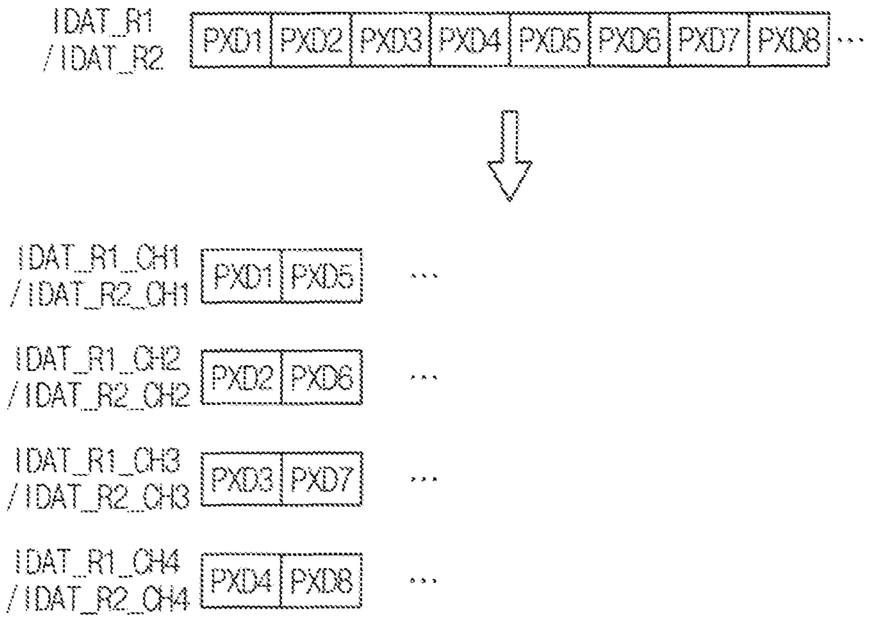
FIG. 13 is a diagram for describing an example of input data transferred through first through fourth channels.

FIG. 11 is a block diagram illustrating a contrast enhancement device according to embodiments, FIG. 12A is a diagram illustrating an example of input data in a normal mode, FIG. 12B is a diagram illustrating an example of input data in a diagnosis mode, FIG. 13 is a diagram for describing an example of input data transferred through first through fourth channels, FIG. 14A is a diagram for describing an example of first region diagnosis result data for a first display region, FIG. 14B is a diagram for describing an example of second region diagnosis result data for a second display region, and FIG. 14C is a diagram for describing examples of fault positions according to the first and second region diagnosis result data.

Referring to FIG. 11, a contrast enhancement device 100*b* of a display device according to embodiments may include an input select circuit 120*b*, an analysis circuit 140*b*, a process circuit 160*b*, a reference storage circuit 170*b* and a diagnosis circuit 180*b*. The contrast enhancement device 100*b* of FIG. 11 may have a similar configuration and a similar operation as those of the contrast enhancement device 100*a* described above with reference to FIG. 6, except that the contrast enhancement device 100*b* may have first, second, third and fourth channels CH1, CH2, CH3 and CH4.

The input select circuit 120*b* may include a first multiplexer MUX1 for selecting input data IDAT_R1_CH1 and IDAT_R2_CH1 for the first channel CH1, a second multiplexer MUX2 for selecting the input data IDAT_R1_CH2 and IDAT_R2_CH2 for the second channel CH2, a third multiplexer MUX3 for selecting the input data IDAT_R1_CH3 and IDAT_R2_CH3 for the third channel CH3, and a fourth multiplexer MUX4 for selecting the input data IDAT_R1_CH4 and IDAT_R2_CH4 for the fourth channel CH4, and a parameter multiplexer PMUX for a parameter selection.

In a normal mode, as illustrated in FIG. 12A, the analysis circuit 140*b* may receive input image data IIDAT as the input data IDAT. In an embodiment, for example, the analysis circuit 140*b* may receive, as first region data IDAT_R1 for a first display region DR1, the input image data IIDAT_R1_CH1, IIDAT_R1_CH2, IIDAT_R1_CH3 and IIDAT_R1_CH4 for the first display region DR1 through the first, second, third and fourth channels CH1, CH2, CH3 and CH4 in a first period P1 of a frame period FP, and may receive, as second region data IDAT_R2 for a second display region DR2, the input image data IIDAT_R2_CH1, IIDAT_R2_CH2, IIDAT_R2_CH3 and IIDAT_R2_CH4 for the second display region DR2 through the first, second, third and fourth channels CH1, CH2, CH3 and CH4 in a second period P2 of the frame period FP.

Further, in a diagnosis mode, as illustrated in FIG. 12B, the analysis circuit 140*b* may receive input test data ITDAT as the input data IDAT. In an embodiment, for example, the analysis circuit 140*b* may receive, as the first region data IDAT_R1 for the first display region DR1, the input test data ITDAT_R1_CH1, ITDAT_R1_CH2, ITDAT_R1_CH3 and ITDAT_R1_CH4 for the first display region DR1 through the first, second, third and fourth channels CH1, CH2, CH3 and CH4 in the first period P1 of the frame period FP, and may receive, as the second region data IDAT_R2 for the second display region DR2, the input test data ITDAT_R2_CH1, ITDAT_R2_CH2, ITDAT_R2_CH3 and ITDAT_R2_CH4 for the second display region DR2 through the first, second, third and fourth channels CH1, CH2, CH3 and CH4 in the second period P2 of the frame period FP.

Each of the first region data IDAT_R1 and the second region data IDAT_R2 may be transferred in parallel through the first channel CH1, the second channel CH2, the third channel CH3 and the fourth channel CH4. In an embodiment, for example, as illustrated in FIG. 13, each region data IDAT_R1/IDAT_R2 may sequentially include first, second, third, fourth, fifth, sixth, seventh and eighth pixel data PXD1, PXD2, PXD3, PXD4, PXD5, PXD6, PXD7 and PXD8. In such an embodiment, each region data IDAT_R1_CH1/IDAT_R2_CH1 transferred through the first channel CH1 may include the first and fifth pixel data PXD1 and PXD5, each region data IDAT_R1_CH2/IDAT_R2_CH2 transferred through the second channel CH2 may include the second and sixth pixel data PXD2 and PXD6, each region data IDAT_R1_CH3/IDAT_R2_CH3 transferred through the third channel CH3 may include the third and seventh pixel data PXD3 and PXD7, each region data IDAT_R1_CH4/IDAT_R2_CH4 transferred through the fourth channel CH4 may include the fourth and eighth pixel data PXD4 and PXD8, and each region data IDAT_R1/IDAT_R2 may be transferred in parallel through the first channel CH1, the second channel CH2, the third channel CH3 and the fourth channel CH4.

The analysis circuit 140*b* may include a first region analysis circuit 142*b* that generates a first region contrast enhancement coefficient CEC R1 for the first display region DR1 by analyzing the first region data IDAT_R1_CH1, IDAT_R1_CH2, IDAT_R1_CH3 and IDAT_R1_CH4, and a second region analysis circuit 144*b* that generates a second region contrast enhancement coefficient CEC_R2 for the second display region DR2 by analyzing the second region data IDAT_R2_CH1, IDAT_R2_CH2, IDAT_R2_CH3 and IDAT_R2_CH4.

The process circuit 160*b* may include a first channel process circuit 162*b* for the first channel CH1, a second channel process circuit 164*b* for the second channel CH2, a third channel process circuit 166*b* for the third channel CH3, and a fourth channel process circuit 168*b* for the fourth channel CH4. In an embodiment, the first channel process circuit 162*b* may perform a contrast enhancement process on the first region data IDAT_R1_CH1 transferred through the first channel CH1 based on the first region contrast enhancement coefficient CEC R1 in the first period P1, and may perform the contrast enhancement process on the second region data IDAT_R2_CH1 transferred through the first channel CH1 based on the second region contrast enhancement coefficient CEC_R2 in the second period P2. In such an embodiment, the second channel process circuit 164*b* may perform the contrast enhancement process on the first region data IDAT_R1_CH2 transferred through the second channel CH2 based on the first region contrast enhancement coefficient CEC R1 in the first period P1, and may perform the contrast enhancement process on the second region data IDAT_R2_CH2 transferred through the second channel CH2 based on the second region contrast enhancement coefficient CEC_R2 in the second period P2. In such an embodiment, the third channel process circuit 166*b* may perform the contrast enhancement process on the first region data IDAT_R1_CH3 transferred through the third channel CH3 based on the first region contrast enhancement coefficient CEC R1 in the first period P1, and may perform the contrast enhancement process on the second region data IDAT_R2_CH3 transferred through the third channel CH3 based on the second region contrast enhancement coefficient CEC_R2 in the second period P2. In such an embodiment, the fourth channel process circuit 168*b* may perform the contrast enhancement process on the first region data IDAT_R1_CH4 transferred through the fourth channel CH4 based on the first region contrast enhancement coefficient CEC R1 in the first period P1, and may perform the contrast enhancement process on the second region data IDAT_R2_CH4 transferred through the fourth channel CH4 based on the second region contrast enhancement coefficient CEC_R2 in the second period P2.

In the normal mode, the diagnosis circuit 180*b* may output the output data ODAT_R1_CH1, ODAT_R1_CH2, ODAT_R1_CH3, ODAT_R1_CH4, ODAT_R2_CH1, ODAT_R2_CH2, ODAT_R2_CH3 and ODAT_R2_CH4 received from the first, second, third and fourth channel process circuits 162*b*, 164*b*, 166*b* and 168*b*, or output image data OIDAT_R1_CH1, OIDAT_R1_CH2, OIDAT_R1_CH3, OIDAT_R1_CH4, OIDAT_R2_CH1, OIDAT_R2_CH2, OIDAT_R2_CH3 and OIDAT_R2_CH4.

In an embodiment of the contrast enhancement device 100*b* illustrated in FIG. 11, the input test data ITDAT may include first, second, third and fourth input channel test data ITDAT_R1_CH1, ITDAT_R1_CH2, ITDAT_R1_CH3 and ITDAT_R1_CH4 for the first, second, third and fourth channels CH1, CH2, CH3 and CH4 with respect to the first display region DR1, and fifth, sixth, seventh and eighth input channel test data ITDAT_R2_CH1, ITDAT_R2_CH2, ITDAT_R2_CH3 and ITDAT_R2_CH4 for the first, second, third and fourth channels CH1, CH2, CH3 and CH4 with respect to the second display region DR2. In the diagnosis mode, the first, second, third and fourth channel process circuits 162*b*, 164*b*, 166*b* and 168*b* may respectively generate first, second, third and fourth output channel test data OTDAT_R1_CH1, OTDAT_R1_CH2, OTDAT_R1_CH3 and OTDAT_R1_CH4 by performing the contrast enhancement process on the first, second, third and fourth input channel test data ITDAT_R1_CH1, ITDAT_R1_CH2, ITDAT_R1_CH3 and ITDAT_R1_CH4 in the first period P1, and may respectively generate fifth, sixth, seventh and eighth output channel test data OTDAT_R2_CH1, OTDAT_R2_CH2, OTDAT_R2_CH3 and OTDAT_R2_CH4 by performing the contrast enhancement process on the fifth, sixth, seventh and eighth input channel test data ITDAT_R2_CH1, ITDAT_R2_CH2, ITDAT_R2_CH3 and ITDAT_R2_CH4 in the second period P2. The reference storage circuit 170*b* may store first, second, third, fourth, fifth, sixth, seventh and eighth reference channel test data RTDAT_R1_CH1, RTDAT_R1_CH2, RTDAT_R1_CH3, RTDAT_R1_CH4, RTDAT_R2_CH1, RTDAT_R2_CH2, RTDAT_R2_CH3 and RTDAT_R2_CH4 respectively corresponding to the first, second, third, fourth, fifth, sixth, seventh and eighth input channel test data ITDAT_R1_CH1, ITDAT_R1_CH2, ITDAT_R1_CH3, ITDAT_R1_CH4, ITDAT_R2_CH1, ITDAT_R2_CH2, ITDAT_R2_CH3 and ITDAT_R2_CH4. The diagnosis circuit 180*b* may generate first region diagnosis result data DRDAT_R1 by respectively comparing the first, second, third and fourth output channel test data OTDAT_R1_CH1, OTDAT_R1_CH2, OTDAT_R1_CH3 and OTDAT_R1_CH4 with the first, second, third and fourth reference channel test data RTDAT_R1_CH1, RTDAT_R1_CH2, RTDAT_R1_CH3 and RTDAT_R1_CH4, and may generate second region diagnosis result data DRDAT_R2 by respectively comparing the fifth, sixth, seventh and eighth output channel test data OTDAT_R2_CH1, OTDAT_R2_CH2, OTDAT_R2_CH3 and OTDAT_R2_CH4 with the fifth, sixth, seventh and eighth reference channel test data RTDAT_R2_CH1, RTDAT_R2_CH2, RTDAT_R2_CH3 and RTDAT_R2_CH4.

In some embodiments, as illustrated in FIG. 14A, the diagnosis circuit 180*b* may generate a first bit B1 of the first region diagnosis result data DRDAT_R1 by comparing the first output channel test data OTDAT_R1_CH1 with the first reference channel test data RTDAT_R1_CH1, may generate a second bit B2 of the first region diagnosis result data DRDAT_R1 by comparing the second output channel test data OTDAT_R1_CH2 with the second reference channel test data RTDAT_R1_CH2, may generate a third bit B3 of the first region diagnosis result data DRDAT_R1 by comparing the third output channel test data OTDAT_R1_CH3 with the third reference channel test data RTDAT_R1_CH3, and may generate a fourth bit B4 of the first region diagnosis result data DRDAT_R1 by comparing the fourth output channel test data OTDAT_R1_CH4 with the fourth reference channel test data RTDAT_R1_CH4.

In such embodiments, as illustrated in FIG. 14B, the diagnosis circuit 180*b* may generate a first bit B1 of the second region diagnosis result data DRDAT_R2 by comparing the fifth output channel test data OTDAT_R2_CH1 with the fifth reference channel test data RTDAT_R2_CH1, may generate a second bit B2 of the second region diagnosis result data DRDAT_R2 by comparing the sixth output channel test data OTDAT_R2_CH2 with the sixth reference channel test data RTDAT_R2_CH2, may generate a third bit B3 of the second region diagnosis result data DRDAT_R2 by comparing the seventh output channel test data OTDAT_R2_CH3 with the seventh reference channel test data RTDAT_R2_CH3, and may generate a fourth bit B4 of the second region diagnosis result data DRDAT_R2 by comparing the eighth output channel test data OTDAT_R2_CH4 with the eighth reference channel test data RTDAT_R2_CH4.

A fault existence and a fault position of the contrast enhancement device 100*b* may be identified or checked based on the first and second region diagnosis result data DRDAT_R1 and DRDAT_R2. In some embodiments, in a case where the first region diagnosis result data DRDAT_R1 represent that N-th output channel test data are different from N-th reference channel test data, and the second region diagnosis result data DRDAT_R2 represent that (N+4)-th output channel test data are different from (N+4)-th reference channel test data, where N is 1, 2, 3 or 4, an N-th channel process circuit among the first, second, third and fourth channel process circuits 162*b*, 164*b*, 166*b* and 168*b* may be determined to be faulty. In an embodiment, for example, as illustrated in FIG. 14C, in a case where the first region diagnosis result data DRDAT_R1 have a value of '0111', and the second region diagnosis result data DRDAT_R2 have a value of '0111', it may be determined that the fault position is the first channel process circuit 162*b*. In such an embodiment, in a case where the first region diagnosis result data DRDAT_R1 have a value of '1011', and the second region diagnosis result data DRDAT_R2 have a value of '1011', it may be determined that the fault position is the second channel process circuit 164*b*. In such an embodiment, in a case where the first region diagnosis result data DRDAT_R1 have a value of '1101', and the second region diagnosis result data DRDAT_R2 have a value of '1101', it may be determined that the fault position is the third channel process circuit 166*b*. In such an embodiment, in a case where the first region diagnosis result data DRDAT_R1 have a value of '1110', and the second region diagnosis result data DRDAT_R2 have a value of '1110', it may be determined that the fault position is the fourth channel process circuit 168*b*.

In such an embodiment, in a case where the first region diagnosis result data DRDAT_R1 represent that all of the first, second, third and fourth output channel test data OTDAT_R1_CH1, OTDAT_R1_CH2, OTDAT_R1_CH3 and OTDAT_R1_CH4 are respectively different from the first, second, third and fourth reference channel test data RTDAT_R1_CH1, RTDAT_R1_CH2, RTDAT_R1_CH3 and RTDAT_R1_CH4, and the second region diagnosis result data DRDAT_R2 represent that all of the fifth, sixth, seventh and eighth output channel test data OTDAT_R2_CH1, OTDAT_R2_CH2, OTDAT_R2_CH3 and OTDAT_R2_CH4 are respectively equal to the fifth, sixth, seventh and eighth reference channel test data RTDAT_R2_CH1, RTDAT_R2_CH2, RTDAT_R2_CH3 and RTDAT_R2_CH4, the first region analysis circuit 142*b* may be determined to be faulty. In an embodiment, for example, as illustrated in FIG. 14C, the first region diagnosis result data DRDAT_R1 have a value of '0000', and the second region diagnosis result data DRDAT_R2 have a value of '1111', it may be determined that the fault position is the first region analysis circuit 142*b*.

In such an embodiment, in a case where the first region diagnosis result data DRDAT_R1 represent that all of the first, second, third and fourth output channel test data OTDAT_R1_CH1, OTDAT_R1_CH2, OTDAT_R1_CH3 and OTDAT_R1_CH4 are respectively equal to the first, second, third and fourth reference channel test data RTDAT_R1_CH1, RTDAT_R1_CH2, RTDAT_R1_CH3 and RTDAT_R1_CH4, and the second region diagnosis result data DRDAT_R2 represent that all of the fifth, sixth, seventh and eighth output channel test data OTDAT_R2_CH1, OTDAT_R2_CH2, OTDAT_R2_CH3 and OTDAT_R2_CH4 are respectively different from the fifth, sixth, seventh and eighth reference channel test data RTDAT_R2_CH1, RTDAT_R2_CH2, RTDAT_R2_CH3 and RTDAT_R2_CH4, the second region analysis circuit 144*b* may be determined to be faulty. In an embodiment, for example, as illustrated in FIG. 14C, the first region diagnosis result data DRDAT_R1 have a value of '1111', and the second region diagnosis result data DRDAT_R2 have a value of '0000', it may be determined that the fault position is the second region analysis circuit 144*b*.

Figure 15:
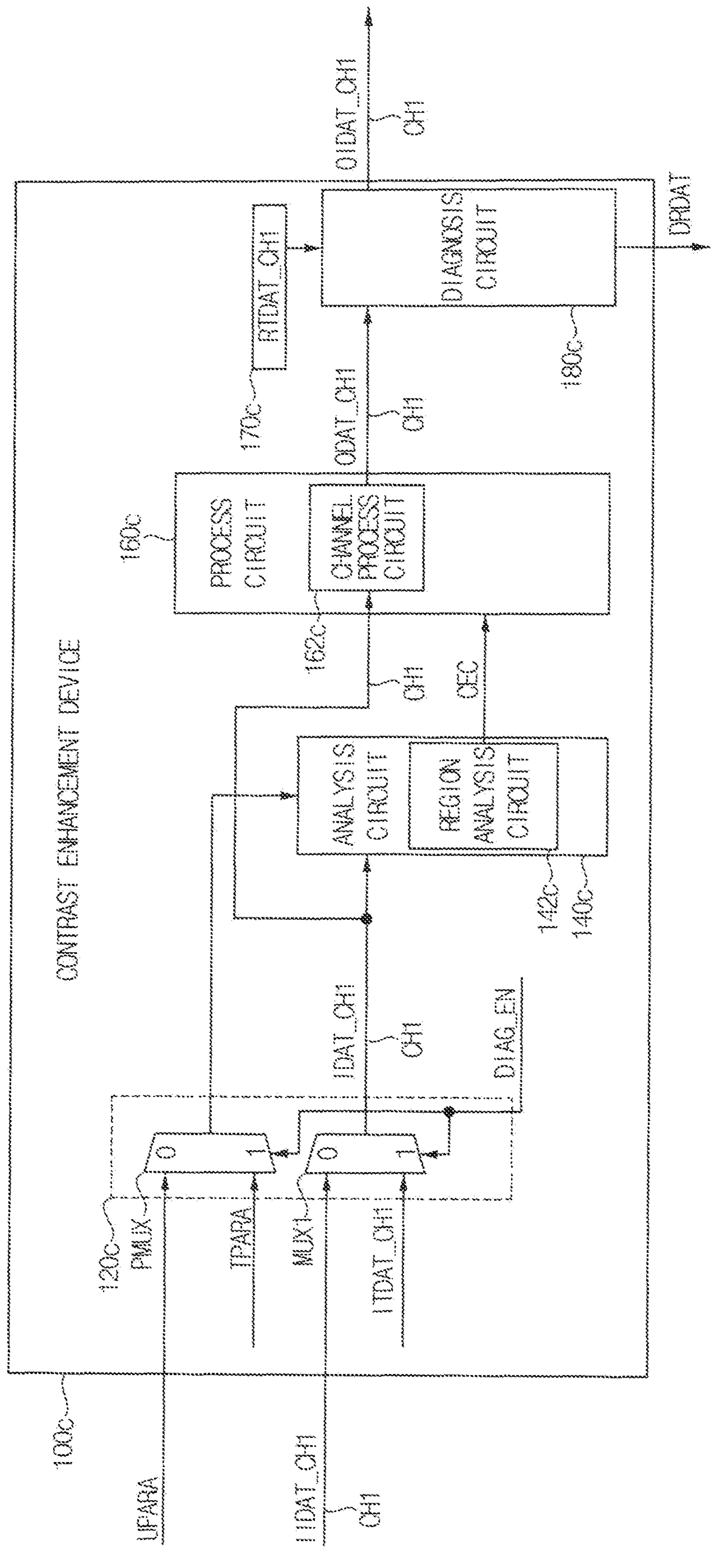
FIG. 15 is a block diagram illustrating a contrast enhancement device according to embodiments.

FIG. 15 is a block diagram illustrating a contrast enhancement device according to embodiments.

Referring to FIG. 15, a contrast enhancement device 100*c* of a display device according to embodiments may include an input select circuit 120*c*, an analysis circuit 140*c*, a process circuit 160*c*, a reference storage circuit 170*c* and a diagnosis circuit 180*c*. The contrast enhancement device 100*c* of FIG. 15 may have a similar configuration and a similar operation as those of the contrast enhancement device 100*a* described above with reference to FIG. 6 or a contrast enhancement device 100*b* of FIG. 11, except that the analysis circuit 140*c* may include only one (or a single) region analysis circuit 142*c* that determines a contrast enhancement coefficient CEC by analyzing input data IDAT CH1 for an entire display region of a display panel, and that the process circuit 160*c* may include only one channel process circuit 162*c* that generates output data ODAT_CH1 by performing a contrast enhancement process on the input data IDAT CH1 for one channel CH1.

The input select circuit 120*c* may include a multiplexer MUX1 for selecting the input data IDAT CH1 for the one channel CH1, and a parameter multiplexer PMUX for a parameter selection. The region analysis circuit 142*c* may determine the contrast enhancement coefficient CEC by analyzing input image data IIDAT CH1 for the entire display region in a normal mode, and may determine the contrast enhancement coefficient CEC by analyzing input test data ITDAT_CH1 for the entire display region in a diagnosis mode. The channel process circuit 162*c* may generate output image data OIDAT_CH1 as the output data ODAT_CH1 by performing the contrast enhancement process on the input image data IIDAT CH1 transferred through the one channel CH1 in the normal mode, and may generate output test data as the output data ODAT_CH1 by performing the contrast enhancement process on the input test data ITDAT_CH1 transferred through the one channel CH1 in the diagnosis mode. The diagnosis circuit 180*c* may output the output image data OIDAT_CH1 in the normal mode, and may generate diagnosis result data DRDAT for the contrast enhancement device 100*c* by comparing the output test data with reference test data RTDAT_CH1 stored in the reference storage circuit 170*c*. In such embodiments, in a case where the diagnosis result data DRDAT represent that the output test data are substantially the same as or equal to the reference test data RTDAT_CH1, it may be determined that no fault occurs in the contrast enhancement device 100*c*. In such embodiments, in a case where the diagnosis result data DRDAT represent that the output test data are different from the reference test data RTDAT_CH1, it may be determined that a fault occurs in the contrast enhancement device 100*c*.

Although FIG. 15 illustrates an embodiment where the analysis circuit 140*c* includes only one region analysis circuit 142*c* for the entire display region of the display panel, and FIGS. 6 and 11 illustrates embodiments where an analysis circuit 140*a* or 140*b* includes two region analysis circuits 142*a* and 144*a*, or 142*b* and 144*b* for two display regions, the number of the region analysis circuits in the contrast enhancement device 100*c* according to embodiments is not limited to the embodiments of FIGS. 6, 11 and 15. In an embodiment, for example, the display panel may have three or more display regions, and the contrast enhancement device 100*c* according to embodiments may include three or more region analysis circuits respectively for the three or more display regions. Further, although FIG. 15 illustrates an embodiment where the contrast enhancement device 100*c* has one channel CH1, FIG. 6 illustrates an embodiment where the contrast enhancement device 100*a* has two channels CH1 and CH2, and FIG. 11 illustrates an embodiment where the contrast enhancement device 100*b* has four channels CH1, CH2, CH3 and CH4, the number of the channels of the contrast enhancement device 100*c* according to embodiments is not limited to the examples of FIGS. 6, 11 and 15. In an embodiment, for example, the contrast enhancement device 100*c* according to embodiments may have three channels, or five or more channels.

Figure 16:
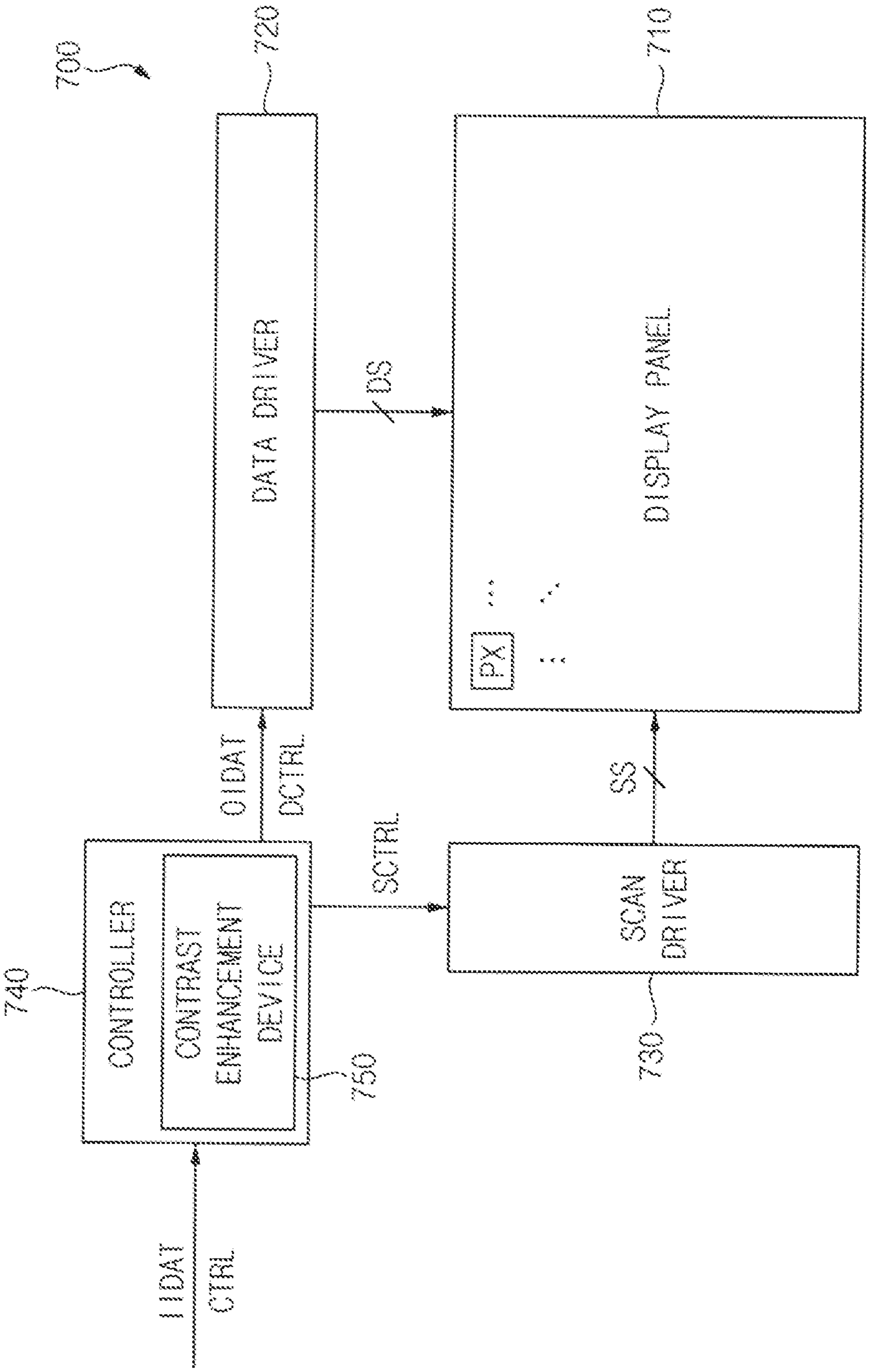
FIG. 16 is a block diagram illustrating a display device including a contrast enhancement device according to embodiments.

FIG. 16 is a block diagram illustrating a display device including a contrast enhancement device according to embodiments.

Referring to FIG. 16, a display device 700 according to embodiments may include a display panel 710 that includes a plurality of pixels PX, a data driver 720 that provides data signals DS to the plurality of pixels PX, a scan driver 730 that provides scan signals SS to the plurality of pixels PX, and a controller 740 that controls the data driver 720 and the scan driver 730.

The display panel 710 may include a plurality of data lines, a plurality of scan lines, and the plurality of pixels PX coupled (or connected) to the plurality of data lines and the plurality of scan lines. In some embodiments, each pixel PX may include a light emitting element, and the display panel 710 may be a light emitting display panel. In an embodiment, for example, the light emitting element may be an organic light emitting diode (OLED), and the display panel 710 may be an OLED display panel. In an alternative embodiment, for example, the light emitting element may be a nano light emitting diode (NED), a quantum dot (QD) light emitting diode, a micro light emitting diode, an inorganic light emitting diode, or any other suitable light emitting element. In other alternative embodiments, each pixel PX may include a switching transistor, and a liquid crystal capacitor coupled to the switching transistor, and the display panel 710 may be a liquid crystal display (LCD) panel. However, the display panel 710 is not limited to the light emitting display panel and the LCD panel, and may be any other suitable display panel.

The data driver 720 may generate the data signals DS based on a data control signal DCTRL and output image data OIDAT received from the controller 740, and may provide the data signals DS corresponding to the output image data OIDAT to the plurality of pixels PX through the plurality of data lines. In some embodiments, the data control signal DCTRL may include, but not limited to, an output data enable signal, a horizontal start signal, a load signal, etc. In some embodiments, the data driver 720 and the controller 740 may be implemented as a single integrated circuit, and the single integrated circuit may be referred to as a timing controller embedded data driver. In alternative embodiments, the data driver 720 and the controller 740 may be implemented with separate integrated circuits, respectively.

The scan driver 730 may generate the scan signals SS based on a scan control signal SCTRL received from the controller 740, and may sequentially provide the scan signals SS to the plurality of pixels PX through the plurality of scan lines on a row-by-row basis. In some embodiments, the scan control signal SCTRL may include, but not limited to, a scan start signal, a scan clock signal, etc. In some embodiments, the scan driver 730 may be integrated or formed in a peripheral portion of the display panel 710. In alternative embodiments, the scan driver 730 may be implemented with one or more integrated circuits.

The controller 740 (e.g., a timing controller) may receive input image data IIDAT and a control signal CTRL from an external host processor (e.g., an application processor (AP), a graphics processing unit (GPU) or a graphics card). In some embodiments, the control signal CTRL may include a vertical synchronization signal, a horizontal synchronization signal, an input data enable signal, a master clock signal, etc. The controller 740 may generate the output image data OIDAT, the data control signal DCTRL and the scan control signal SCTRL based on the input image data IIDAT and the control signal CTRL. The controller 740 may control the data driver 720 by providing the output image data OIDAT and the data control signal DCTRL to the data driver 720, and may control the scan driver 730 by providing the scan control signal SCTRL to the scan driver 730.

The controller 740 of the display device 700 according to embodiments may include a contrast enhancement device 750 that generates the output image data OIDAT by performing a contrast enhancement process on the input image data IIDAT. According to embodiments, the contrast enhancement device 750 may correspond to a contrast enhancement device 100 of FIG. 1, a contrast enhancement device 100*a* of FIG. 6, a contrast enhancement device 100*b* of FIG. 11, a contrast enhancement device 100*c* of FIG. 15, or the like. In a diagnosis mode, the contrast enhancement device 750 may generate output test data by performing the contrast enhancement process on input test data, and may generate diagnosis result data for the contrast enhancement device 750 by comparing the output test data with reference test data. Accordingly, a fault existence and a fault position of the contrast enhancement device 750 may be identified or checked.

Figure 17:
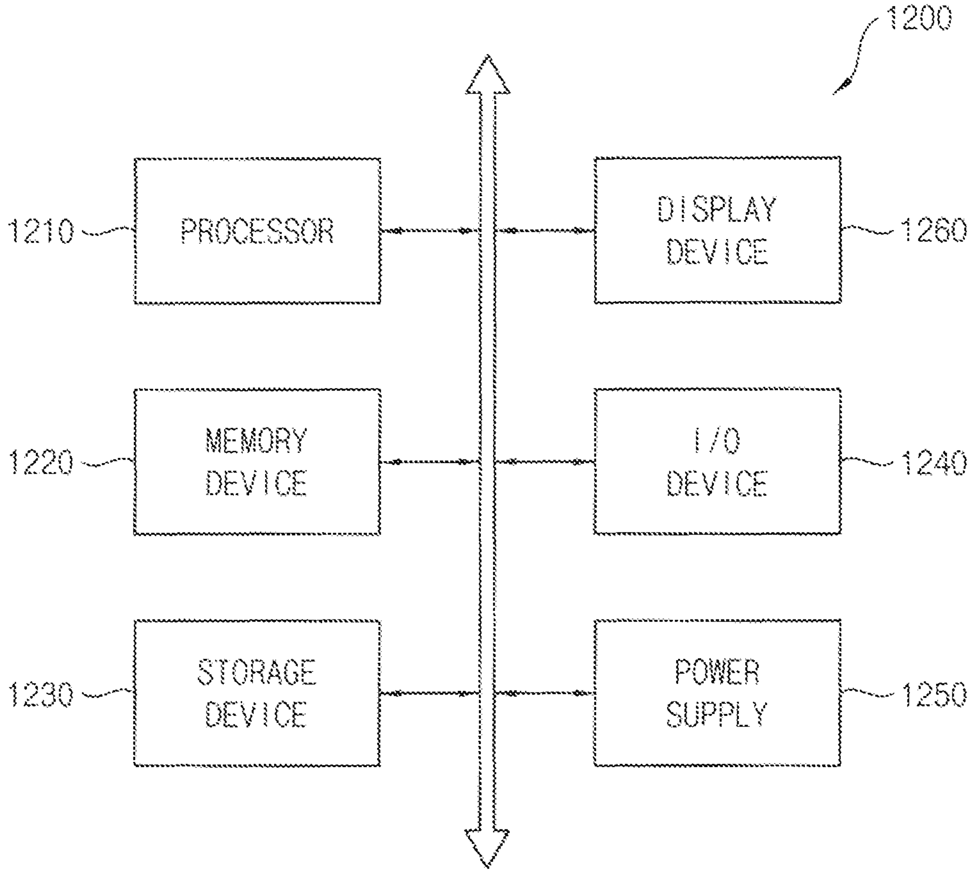
FIG. 17 is a block diagram illustrating an electronic device including a display device according to embodiments.

FIG. 17 is a block diagram illustrating an electronic device including a display device according to embodiments.

Referring to FIG. 17, an embodiment of an electronic device 1200 may include a processor 1210, a memory device 1220, a storage device 1230, an input/output (I/O) device 1240, a power supply 1250, and a display device 1260. The electronic device 1200 may further include a plurality of ports for communicating with a video card, a sound card, a memory card, a universal serial bus (USB) device, other electric devices, etc.

The processor 1210 may perform various computing functions or tasks. The processor 1210 may be an application processor (AP), a micro processor, a central processing unit (CPU), etc. The processor 1210 may be coupled to other components via an address bus, a control bus, a data bus, etc. Further, in some embodiments, the processor 1210 may be further coupled to an extended bus such as a peripheral component interconnection (PCI) bus.

The memory device 1220 may store data for operations of the electronic device 1200. In an embodiment, for example, the memory device 1220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1230 may be a solid state drive (SSD) device, a hard disk drive (HDD) device, a CD-ROM device, etc. The I/O device 1240 may be an input device such as a keyboard, a keypad, a mouse, a touch screen, etc., and an output device such as a printer, a speaker, etc. The power supply 1250 may supply power for operations of the electronic device 1200. The display device 1260 may be coupled to other components through the buses or other communication links.

In such an embodiment, the display device 1260 may include a contrast enhancement device that performs a contrast enhancement process on input image data. In a diagnosis mode, the contrast enhancement device may generate output test data by performing the contrast enhancement process on input test data, and may generate diagnosis result data for the contrast enhancement device by comparing the output test data with reference test data. Accordingly, a fault existence and a fault position of the contrast enhancement device may be identified or checked.

The inventive concepts may be applied to any display device 1260, and any electronic device 1200 including the display device 1260. In an embodiment, for example, the inventive concepts may be applied to a mobile phone, a smart phone, a tablet computer, a television (TV), a digital TV, a three-dimensional (3D) TV, a wearable electronic device, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A contrast enhancement device included in a display device, the contrast enhancement device comprising:

an analysis circuit which receives input image data as input data in a normal mode, receives input test data as the input data in a diagnosis mode, and determines a contrast enhancement coefficient by analyzing the input data;

a process circuit which generates output data by performing a contrast enhancement process on the input data based on the contrast enhancement coefficient, wherein the output data in the normal mode is output image data corresponding to the input image data, and the output data in the diagnosis mode is output test data corresponding to the input test data; and a diagnosis circuit which outputs the output image data in the normal mode, and generates diagnosis result data for the contrast enhancement device by comparing the output test data with reference test data in the diagnosis mode.

2. The contrast enhancement device of claim 1, wherein the analysis circuit determines an average luminance value, a low gray luminance value, a middle gray luminance value and a high gray luminance value of the input data by analyzing luminance values of the input data, and the analysis circuit determines, as the contrast enhancement coefficient, a low gray input luminance value, a middle gray input luminance value, a high gray input luminance value, a low gray output luminance value, a middle gray output luminance value and a high gray output luminance value based on the average luminance value, the low gray luminance value, the middle gray luminance value and the high gray luminance value of the input data.

3. The contrast enhancement device of claim 2, wherein:

the analysis circuit calculates an average luminance value of the luminance values of the input data, when the average luminance value is lower than a first reference average luminance value, the analysis circuit determines:

the low gray luminance value by calculating an average value of the luminance values lower than a first reference middle luminance value;

the middle gray luminance value as the first reference middle luminance value; and the high gray luminance value by calculating an average value of the luminance values higher than the first reference middle luminance value, when the average luminance value is higher than or equal to the first reference average luminance value and is lower than a second reference average luminance value, the analysis circuit determines:

the low gray luminance value by calculating an average value of the luminance values lower than a second reference middle luminance value;

the middle gray luminance value as the second reference middle luminance value; and the high gray luminance value by calculating an average value of the luminance values higher than the second reference middle luminance value, and when the average luminance value is higher than or equal to the second reference average luminance value, the analysis circuit determines:

the low gray luminance value by calculating an average value of the luminance values lower than a third reference middle luminance value;

the middle gray luminance value as the third reference middle luminance value; and the high gray luminance value by calculating an average value of the luminance values higher than the third reference middle luminance value.

4. The contrast enhancement device of claim 3, wherein the analysis circuit determines:

the low gray input luminance value using equation: IN_LOW=Y_AVG/2;

the middle gray input luminance value using equation: IN_MID=Y_AVG;

the high gray input luminance value using equation: IN_HIGH=(Y_MAX−Y_AVG)/2+Y_AVG;

the low gray output luminance value using equation: OUT_LOW=IN_LOW−|(Y_LOW−IN_LOW)|;

the middle gray output luminance value using equation: OUT_MID=IN_MID; and the high gray output luminance value using equation: OUT_HIGH=IN_HIGH+|(Y_HIGH−IN_HIGH)|, wherein IN_LOW represents the low gray input luminance value, IN_MID represents the middle gray input luminance value, IN_HIGH represents the high gray input luminance value, Y_AVG represents the average luminance value, Y_LOW represents the low gray luminance value, Y_HIGH represents the high gray luminance value, Y_MAX represents a maximum luminance value, OUT_LOW represents the low gray output luminance value, OUT_MID represents the middle gray output luminance value, and OUT_HIGH represents the high gray output luminance value.

5. The contrast enhancement device of claim 4, wherein the analysis circuit applies a gain coefficient to a difference between the low gray input luminance value and the low gray output luminance value to determine the low gray output luminance value having an increased difference with respect to the low gray input luminance value, and the analysis circuit applies the gain coefficient to a difference between the high gray input luminance value and the high gray output luminance value to determine the high gray output luminance value having an increased difference with respect to the high gray input luminance value.

6. The contrast enhancement device of claim 1, wherein:

the process circuit receives, as the contrast enhancement coefficient, a low gray input luminance value, a middle gray input luminance value, a high gray input luminance value, a low gray output luminance value, a middle gray output luminance value and a high gray output luminance value from the analysis circuit, the process circuit determines a conversion difference value with respect to each luminance value of the input data by using the low gray input luminance value, the middle gray input luminance value, the high gray input luminance value, the low gray output luminance value, the middle gray output luminance value and the high gray output luminance value, and the process circuit calculates an output luminance value corresponding to the luminance value of the input data by adding the conversion difference value to the luminance value of the input data.

7. The contrast enhancement device of claim 6, wherein:

when the luminance value of the input data is lower than the middle gray input luminance value, the process circuit determines the conversion difference value for the luminance value using equation: CONV_DIFF=2*(OUT_LOW−IN_LOW)*Y_IN /IN_LOW−(OUT_LOW−IN_LOW)*(Y_IN)^2/(IN_LOW)^2, wherein CONV_DIFF represents the conversion difference value, OUT_LOW represents the low gray output luminance value, IN_LOW represents the low gray input luminance value, and Y_IN represents the luminance value of the input data, when the luminance value of the input data is higher than the middle gray input luminance value, the process circuit determines the conversion difference value for the luminance value using equation: CONV_DIFF=2*(OUT_HIGH−IN_HIGH)*(Y_IN−IN_MID)/(IN_HIGH−IN_MID)−(OUT_HIGH−IN_HIGH)*(Y_IN−IN_MID)^2/(IN_HIGH-IN_MID)^2, wherein CONV_DIFF represents the conversion difference value, OUT_HIGH represents the high gray output luminance value, IN_HIGH represents the high gray input luminance value, Y_IN represents the luminance value of the input data, and IN_MID represents the middle gray input luminance value, and when the luminance value of the input data is equal to the middle gray input luminance value, the process circuit determines the conversion difference value as 0, and wherein the process circuit calculates the output luminance value corresponding to the luminance value of the input data using equation: Y_OUT=Y_IN+CONV_DIFF, wherein Y_OUT represents the output luminance value, Y_IN represents the luminance value of the input data, and CONV_DIFF represents the conversion difference value.

8. The contrast enhancement device of claim 1, further comprising:

an RGB-to-YCbCr converter which performs an RGB-to-YCbCr conversion operation on the input image data to generate YCbCr data including luminance data and chrominance data, and provides the YCbCr data as the input image data to the analysis circuit; and an YCbCr-to-RGB converter which performs an YCbCr-to-RGB conversion operation on the output image data to generate RGB data.

9. The contrast enhancement device of claim 1, further comprising:

an input select circuit which selectively provides, as the input data, the input image data or the input test data to the analysis circuit in response to a diagnosis enable signal.

10. The contrast enhancement device of claim 1, further comprising:

a reference storage circuit which stores the reference test data which are previously determined with respect to the input test data.

11. The contrast enhancement device of claim 1, wherein the display device includes a display panel including a plurality of display regions, wherein the input data include a plurality of region data for the plurality of display regions, and wherein the analysis circuit includes:

a plurality of region analysis circuits which generates region contrast enhancement coefficients for the plurality of display regions by analyzing the plurality of region data, respectively.

12. The contrast enhancement device of claim 1, wherein the input data are transferred in parallel through a plurality of channels, and wherein the process circuit includes:

a plurality of channel process circuits which performs the contrast enhancement process with respect to the plurality of channels, respectively.

13. The contrast enhancement device of claim 1, wherein the display device includes a foldable display panel including a first display region and a second display region divided by a folding line, and each of the first display region and the second display region is selectively activated, wherein the input data include first region data for the first display region and second region data for the second display region, and wherein the analysis circuit includes:

a first region analysis circuit which generates a first region contrast enhancement coefficient for the first display region by analyzing the first region data; and a second region analysis circuit which generates a second region contrast enhancement coefficient for the second display region by analyzing the second region data.

14. The contrast enhancement device of claim 13, wherein each of the first region data and the second region data are transferred in parallel through a first channel and a second channel, and wherein the process circuit includes:

a first channel process circuit which performs the contrast enhancement process on the first region data transferred through the first channel based on the first region contrast enhancement coefficient in a first period in which the first region data are transferred, and performs the contrast enhancement process on the second region data transferred through the first channel based on the second region contrast enhancement coefficient in a second period in which the second region data are transferred; and a second channel process circuit which performs the contrast enhancement process on the first region data transferred through the second channel based on the first region contrast enhancement coefficient in the first period, and performs the contrast enhancement process on the second region data transferred through the second channel based on the second region contrast enhancement coefficient in the second period.

15. The contrast enhancement device of claim 14, wherein the input test data include first and second input channel test data for the first and second channels with respect to the first display region, and third and fourth input channel test data for the first and second channels with respect to the second display region, wherein the reference test data include first through fourth reference channel test data respectively corresponding to the first through fourth input channel test data, wherein, in the diagnosis mode, the first and second channel process circuits respectively generate first and second output channel test data as the output test data by performing the contrast enhancement process on the first and second input channel test data in the first period, and respectively generate third and fourth output channel test data as the output test data by performing the contrast enhancement process on the third and fourth input channel test data in the second period, and wherein the diagnosis circuit generates, as the diagnosis result data, first region diagnosis result data by respectively comparing the first and second output channel test data with the first and second reference channel test data, and second region diagnosis result data by respectively comparing the third and fourth output channel test data with the third and fourth reference channel test data.

16. The contrast enhancement device of claim 13, wherein each of the first region data and the second region data are transferred in parallel through a first channel, a second channel, a third channel and a fourth channel, and wherein the process circuit includes:

a first channel process circuit which performs the contrast enhancement process on the first region data transferred through the first channel based on the first region contrast enhancement coefficient in a first period in which the first region data are transferred, and performs the contrast enhancement process on the second region data transferred through the first channel based on the second region contrast enhancement coefficient in a second period in which the second region data are transferred;

a second channel process circuit which performs the contrast enhancement process on the first region data transferred through the second channel based on the first region contrast enhancement coefficient in the first period, and performs the contrast enhancement process on the second region data transferred through the second channel based on the second region contrast enhancement coefficient in the second period;

a third channel process circuit which performs the contrast enhancement process on the first region data transferred through the third channel based on the first region contrast enhancement coefficient in the first period, and performs the contrast enhancement process on the second region data transferred through the third channel based on the second region contrast enhancement coefficient in the second period; and a fourth channel process circuit which performs the contrast enhancement process on the first region data transferred through the fourth channel based on the first region contrast enhancement coefficient in the first period, and performs the contrast enhancement process on the second region data transferred through the fourth channel based on the second region contrast enhancement coefficient in the second period.

17. The contrast enhancement device of claim 16, wherein the input test data include first through fourth input channel test data for the first through fourth channels with respect to the first display region, and fifth through eighth input channel test data for the fifth through eighth channels with respect to the second display region, wherein the reference test data include first through eighth reference channel test data respectively corresponding to the first through eighth input channel test data, wherein, in the diagnosis mode, the first through fourth channel process circuits respectively generate first through fourth output channel test data as the output test data by performing the contrast enhancement process on the first through fourth input channel test data in the first period, and respectively generate fifth through eighth output channel test data as the output test data by performing the contrast enhancement process on the fifth through eighth input channel test data in the second period, and wherein the diagnosis circuit generates, as the diagnosis result data, first region diagnosis result data by respectively comparing the first through fourth output channel test data with the first through fourth reference channel test data, and second region diagnosis result data by respectively comparing the fifth through eighth output channel test data with the fifth through eighth reference channel test data.

18. The contrast enhancement device of claim 17, wherein, when the first region diagnosis result data represent that N-th output channel test data are different from N-th reference channel test data, and the second region diagnosis result data represent that (N+4)-th output channel test data are different from (N+4)-th reference channel test data, wherein N is 1, 2, 3 or 4, an N-th channel process circuit among the first through fourth channel process circuits is determined to be faulty, wherein, when the first region diagnosis result data represent that all of the first through fourth output channel test data are respectively different from the first through fourth reference channel test data, and the second region diagnosis result data represent that all of the fifth through eighth output channel test data are respectively equal to the fifth through eighth reference channel test data, the first region analysis circuit is determined to be faulty, and wherein, when the first region diagnosis result data represent that all of the first through fourth output channel test data are respectively equal to the first through fourth reference channel test data, and the second region diagnosis result data represent that all of the fifth through eighth output channel test data are respectively different from the fifth through eighth reference channel test data, the second region analysis circuit is determined to be faulty.

19. A contrast enhancement device included in a display device including a first display region and a second display region, the contrast enhancement device comprising:

a first region analysis circuit which generates a contrast enhancement coefficient for the first display region of the display device by analyzing input data for the first display region;

a second region analysis circuit which generates the contrast enhancement coefficient for the second display region of the display device by analyzing the input data for the second display region;

a first channel process circuit which performs a contrast enhancement process on the input data transferred through a first channel based on the contrast enhancement coefficient for the first and second display regions;

a second channel process circuit which performs the contrast enhancement process on the input data transferred through a second channel based on the contrast enhancement coefficient for the first and second display regions;

a third channel process circuit which performs the contrast enhancement process on the input data transferred through a third channel based on the contrast enhancement coefficient for the first and second display regions;

a fourth channel process circuit which performs the contrast enhancement process on the input data transferred through a fourth channel based on the contrast enhancement coefficient for the first and second display regions; and a diagnosis circuit which outputs output image data generated by the first through fourth channel process circuits in a normal mode, and generates diagnosis result data for the first and second region analysis circuits and the first through fourth channel process circuits by comparing output test data generated by the first through fourth channel process circuits in a diagnosis mode.

20. A display device comprising:

a display panel including a plurality of pixels;

a data driver which provides data signals to the plurality of pixels;

a scan driver which provides scan signals to the plurality of pixels; and a controller which controls the data driver and the scan driver, wherein the controller comprises a contrast enhancement device, wherein the contrast enhancement device comprises:

an analysis circuit which receives input image data as input data in a normal mode, receives input test data as the input data in a diagnosis mode, and determines a contrast enhancement coefficient by analyzing the input data;

a process circuit which generates output data by performing a contrast enhancement process on the input data based on the contrast enhancement coefficient, wherein the output data in the normal mode is output image data corresponding to the input image data, and the output data in the diagnosis mode is output test data corresponding to the input test data; and a diagnosis circuit which outputs the output image data in the normal mode, and generates diagnosis result data for the contrast enhancement device by comparing the output test data with reference test data in the diagnosis mode.

* * * * *